United States Patent
Yilmaz et al.

(10) Patent No.: US 9,114,991 B2
(45) Date of Patent: Aug. 25, 2015

(54) ORGANOTEMPLATE-FREE SYNTHETIC PROCESS FOR THE PRODUCTION OF A ZEOLITIC MATERIAL OF THE LEV-TYPE STRUCTURE

(75) Inventors: Bilge Yilmaz, New York, NY (US); Ulrich Müller, Neustadt (DE); Meike Pfaff, Neunkirchen (DE); Feng-Shou Xiao, Changchun (CN); Bin Xie, Jilin (CN); Haiyan Zhang, Jilin (CN)

(73) Assignee: BASF SE, Ludwigshafen (DE)

( * ) Notice: Subject to any disclaimer, the term of this patent is extended or adjusted under 35 U.S.C. 154(b) by 231 days.

(21) Appl. No.: 13/805,092

(22) PCT Filed: Jun. 17, 2011

(86) PCT No.: PCT/EP2011/060165
§ 371 (c)(1),
(2), (4) Date: Dec. 18, 2012

(87) PCT Pub. No.: WO2011/157839
PCT Pub. Date: Dec. 22, 2011

(65) Prior Publication Data
US 2013/0090234 A1  Apr. 11, 2013

(30) Foreign Application Priority Data
Jun. 18, 2010  (WO) ................ PCT/CN2010/074073

(51) Int. Cl.
| | | |
|---|---|---|
| C01B 39/46 | (2006.01) | |
| C01B 37/02 | (2006.01) | |
| B01J 29/70 | (2006.01) | |
| C01B 39/02 | (2006.01) | |
| B01J 20/18 | (2006.01) | |

(Continued)

(52) U.S. Cl.
CPC ............... *C01B 39/02* (2013.01); *B01J 20/186* (2013.01); *B01J 20/28042* (2013.01); *B01J 20/28057* (2013.01); *B01J 20/3007* (2013.01); *B01J 29/70* (2013.01); *C01B 37/02* (2013.01); *C01B 39/46* (2013.01)

(58) Field of Classification Search
CPC ........ C01B 37/02; C01B 39/02; C01B 39/46; B01J 29/70
USPC ......................................................... 423/709
See application file for complete search history.

(56) References Cited

U.S. PATENT DOCUMENTS
| | | |
|---|---|---|
| 3,459,676 A | 8/1969 | Kerr |
| 4,495,303 A | 1/1985 | Kuehl et al. |

(Continued)

FOREIGN PATENT DOCUMENTS
| | | |
|---|---|---|
| WO | WO-00/06492 | 2/2000 |
| WO | WO-2005/063624 | 7/2005 |
| WO | WO-2007/094949 | 8/2007 |

OTHER PUBLICATIONS

Caullet, P. et al., "Synthesis of LEV-type zeolite from aqueous nonalkaline fluoride aluminosilicate gets", *Zeolites* 15 1995, 139-147.

(Continued)

*Primary Examiner* — David M Brunsman
(74) *Attorney, Agent, or Firm* — Servilla Whitney LLC

(57) ABSTRACT

Described is an organotemplate-free synthetic process for the production of a zeolitic material having an LEV-type framework structure comprising $YO_2$ and optionally comprising $X_2O_3$, wherein said process comprises:
(1) preparing a mixture comprising seed crystals and one or more sources for $YO_2$; and
(2) crystallizing the mixture obtained in step (1);
wherein Y is a tetravalent element, and X is a trivalent element, wherein the zeolitic material optionally comprises one or more alkali metals M, and wherein the seed crystals comprise zeolitic material having an LEV-type framework structure. Also described is a zeolitic material having an LEV-type framework structure obtainable by said process, as well as an organotemplate-free zeolitic material having an LEV-type framework structure comprising $YO_2$ and optionally comprising $X_2O_3$, wherein Y is a tetravalent element, and X is a trivalent element, wherein the zeolitic material optionally comprises one or more alkali metals M, wherein said zeolitic material is non-calcined.

37 Claims, 20 Drawing Sheets

(51) Int. Cl.
*B01J 20/28* (2006.01)
*B01J 20/30* (2006.01)

(56) References Cited

U.S. PATENT DOCUMENTS

| | | | | |
|---|---|---|---|---|
| 6,099,820 | A | * | 8/2000 | Miller .......................... 423/700 |
| 6,974,889 | B1 | * | 12/2005 | Verduijn et al. .............. 585/528 |
| 7,264,789 | B1 | | 9/2007 | Verduijn et al. |
| 2013/0005563 | A1 | * | 1/2013 | Matsuo et al. .................. 502/60 |
| 2013/0064758 | A1 | * | 3/2013 | Yilmaz et al. .................. 423/709 |

OTHER PUBLICATIONS

Yamamoto, Katsutoshi et al., "Synthesis and structure analysis of RUB-50, an LEV-type aluminosilicate zeolite", *Microporous and Mesoporous Materials* 128 2010, 150-157.

* cited by examiner

ORGANOTEMPLATE-FREE SYNTHETIC PROCESS FOR THE PRODUCTION OF A ZEOLITIC MATERIAL OF THE LEV-TYPE STRUCTURE

CROSS-REFERENCE TO RELATED APPLICATIONS

This application is the National Stage entry of PCT/EP2011/060165, filed on Jun. 17, 2011, which claims priority to PCT Patent application number PCT/CN2010/074073, filed on Jun. 18, 2010, both of which are incorporated herein by reference in their entireties.

TECHNICAL FIELD

The present invention relates to a synthetic organotemplate-free zeolitic material with an LEV-type framework structure and to a process for the production of said material which does not involve the use of an organotemplate. Furthermore, the present invention relates to the use of a synthetic organotemplate-free zeolitic material having an LEV-type framework structure.

INTRODUCTION

The LEV-type framework is characterized by heptadecahedral cavities to which the LEV-type zeolites owe their large micropore volume, although this structure only has small eightmembered ring (8MR) pore openings. The framework density of Levyne is comparable to those of Chabazite (CHA) and Erionite (ERI) having closely related framework structures. Thus, although recent research efforts have focused on large or ultra-large pore zeolites having twelve MR or larger pore openings, small pore zeolites are still of importance because they exhibit zeolite-specific definite shape selectivity with respect to reactant molecules in catalyst applications. In particular, such small pore zeolites having large micropore volumes are attractive due to their large adsorption capacities.

Synthetic Levyne-type zeolites are typically prepared using exotic organotemplates as structure directing agents, such as Quinuclidine-based templates, such that their synthesis typically involves high costs. A lower cost alternative is to use diethyldimethylammonium hydroxide as a structure directing agent wherein the diethyldimethylammonium cations act as the organotemplate. Thus, U.S. Pat. No. 7,264,789 B1 discloses a method for preparing LEV-type zeolites which alternatively uses choline and diethyldimethylammonium as organotemplate. A method for the preparation of the LEV-type zeolite RUB-50 using the diethyldimethylammonium cation as oraganotemplate is disclosed in Yamamoto et al. Micropor. Mesopor. Mater. 2009, Vol. 128, pp. 150-157.

Nevertheless, although some progress has been achieved regarding the costs of the organotemplate used in the synthesis of LEV-type zeolites, the major drawback remains with respect to the necessary use of a structure directing agent which must subsequently be removed. In particular, the organotemplates are contained in the pore structure of the resulting zeolite, such that it may first be effectively employed in an application only after removal thereof. Furthermore, the organotemplate may usually only be removed by a calcination process or the like, such that a recycling of the organotemplate is not possible. Another disadvantage concerns the decomposition of the organic template material during hydrothermal synthesis, which not only makes it necessary to employ reaction vessels displaying a high pressure resistance, but also limits the possibility of recycling materials used in synthesis due to the presence of waste products from organic decomposition. As a result of these constraints, the known procedures for the production of LEV-type zeolite materials are highly cost-intensive, making these zeolites unattractive for a variety of applications.

Furthermore, the necessary removal of the organotemplate by calcination at higher temperatures, normally at 450 to 930° C. or even higher, is not only disadvantageous due to the destroyal of costly organic template, but also results in excess energy consumption and produces harmful gases and other unwanted waste products. In addition to this, the harsh thermal treatment ultimately limits the types of architectures which may be provided according to the known production methods. In particular, although ion exchange methods for extracting the organotemplate from the zeolitic material have been developed as an environmentally friendly alternative to calcination for removing the organic template, only part of the organic templates may successfully be recycled, the remainder interacting too strongly with the zeolite framework for complete removal. Accordingly, the synthesis of LEV-type zeolite materials which are devoid of an organotemplate remains effectively limited to those materials capable of withstanding the harsh conditions necessary for the complete removal of the organotemplates necessarily used in the synthesis thereof.

In addition to these major disadvantages, the harsh thermal treatment ultimately limits the production to thermally stable LEV-type zeolite materials, in particular to those which display a high $SiO_2:Al_2O_3$ molar ratio. Although ion-exchange methods for template extraction have been developed as an environmentally friendly alternative to calcination for removing the organotemplate, only part of the organic templates may successfully be recycled, the remainder interacting too strongly with the zeolite framework for removal.

DETAILED DESCRIPTION

It was therefore an object of the present invention to provide a process for the organotemplate-free synthesis of zeolitic material having an LEV-type framework structure.

It was also an object of the present invention to provide a process for the production of an organotemplate-free zeolitic material having an LEV-type framework structure which can be conducted under mild conditions and is non-destructive towards the zeolite architecture. In particular, it was also an object to provide a process for the production of such materials which does not involve a high-temperature calcination treatment or other treatment for the removal of organotemplates present in the framework structure.

A further object of the present invention was to provide an improved and cost-effective process for the production of organotemplate-free zeolitic materials having an LEV-type framework structure, in particular with respect to crystallization time, energy consumption, and environmental pollution.

In addition to this, it was also an object of the present invention to provide synthetic organotemplate-free zeolitic materials having an LEV-type framework structure which display an intact architecture as directly obtained from the crystallization process.

According to the present invention it has surprisingly been found that a zeolitic material having an LEV-type framework structure can be obtained without using an organotemplate in the synthesis thereof. In particular, it has been found that when using seed crystals of a zeoitic material having an LEV-type framework structure in the synthetic process, organotemplate-free zeolitic materials having an LEV-type framework structure can be directly obtained which do not necessitate the typically cost- and time intensive procedures usually required for the removal of organotemplates used in their production. Thus, a one-pot synthetic procedure is provided for directly obtaining a zeolitic material having an LEV-type framework, wherein the porosity is directly given and must not first be provided by one or more post-synthetic treatments for removing structure directing agents from the crystallized framework.

In addition to these considerable advantages, it has surprisingly been found that according to the inventive process, novel zeolitic materials having an LEV-type framework structure can be obtained displaying novel properties which can be advantageously utilized in current and novel applications. In particular, LEV-type frameworks are accessible, of which the chemical composition and/or physical properties thereof may not be obtained by organotemplate-mediated synthesis. Such frameworks include e.g. LEV-type frameworks with exceptionally high Al contents, not achieved by the known synthetic methodologies. Such novel frameworks accessible by organotemplate-free synthesis are of considerable interest, in particular in catalytic applications or also in the trapping of organic molecules as well as in adsorption applications due to the high density of active sites which may be achieved therein.

Further to the above-mentioned advantages, it has yet further been surprisingly found that the organotemplate-free synthetic procedure involves considerably shorter reaction times than organotemplate mediated synthetic methodologies. Furthermore, due to the absence of organic materials in the reaction mixture which are prone to decomposition, low-pressure apparatus may be used in the inventive process, wherein the materials used therein may be easily recycled due to the absence of organic waste products.

Thus, in view of the numerous surprising and considerable advantages mentioned in the foregoing, a highly efficient process is provided for the production of a zeolitic material having an LEV-type framework structure which involves considerably lower costs than organotemplate mediated methodologies. This is not only due to the possibility of using simpler apparatus, in particular with respect to the amount of pressure they must withstand in synthesis. Far more, the novel process does not necessitate organotemplates, which are by far the most expensive components in organotemplate-mediated synthetic methodologies, in particular due to the fact that the expensive organotemplates may not be effectively recycled, but are rather destroyed in the course of providing the organotemplate-free product. Accordingly, the present invention surprisingly provides a process with highly reduced costs in view of the cheap raw materials, the simpler apparatus which may be used, the shorter crystallization times, the highly reduced amount of waste products, thus affording a highly cost- and time-effective production process.

Therefore, the present invention relates to an organotemplate-free synthetic process for the production of a zeolitic material having an LEV-type framework structure comprising $YO_2$ and optionally comprising $X_2O_3$, wherein said process comprises the steps of (1) preparing a mixture comprising seed crystals and one or more sources for $YO_2$; and
(2) crystallizing the mixture obtained in step (1);
wherein Y is a tetravalent element, and X is a trivalent element,
wherein the zeolitic material optionally comprises one or more alkali metals M, and
wherein the seed crystals comprise zeolitic material having an LEV-type framework structure.

According to the inventive process, at no point does the mixture provided in step (1) and crystallized in step (2) contain more than an impurity of an organic structure directing agent specifically used in the synthesis of zeolitic materials having an LEV-type framework structure, in particular specific tetraalkylammonium salts and/or related organotemplates such as 1-methyl-1-azonia-4-azabicyclo[2.2.2]octane, N-methylquinuclidinium salts and/or diethyldimethylammonium salts. Such an impurity can, for example, be caused by organic structure directing agents still present in seed crystals used in the inventive process. Organotemplates contained in seed crystal material may not, however, participate in the crystallization process since they are trapped within the seed crystal framework and therefore may not act structure directing agents within the meaning of the present invention.

Within the meaning of the present invention, an "organotemplate-free" synthetic process relates to a synthetic process wherein the materials used therein are substantially free of organotemplate materials, wherein "substantially" as employed in the present invention with respect to the amount of one or more organotemplates contained in the one or more materials used in a synthetic process indicates an amount of 0.001 wt.-% or less of one or more organotemplates, preferably 0.0005 wt.-% or less, more preferably 0.00001 wt.-% or less, more preferably 0.000005 wt.-% or less, and even more preferably 0.000001 wt.-% or less thereof. Said amounts of one or more organotemplates, if at all present an any one of the materials used in the synthetic process, may also be denoted as "impurities" or "trace amounts" within the meaning of the present invention. Furthermore, it is noted that the terms "organotemplate" and "organic structure directing agent" are synonymously used in the present application.

The term "organotemplate" as employed in the present application designates any conceivable organic material which is suitable for template-mediated synthesis of a zeolite material, preferably of a zeolite material having a LEV-type framework-structure, and even more preferably which is suitable for the synthesis of RUB-50. Such organotemplates include e.g. 1-methyl-1-azonia-4-azabicyclo[2.2.2]octane, the N-methylquinuclidinium cation and/or the diethyldimethylammonium cation.

Furthermore, $YO_2$ and optionally $X_2O_3$ are comprised in the LEV-type framework structure as structure building elements, as opposed to non-framework elements which can be present in the pores and cavities formed by the framework structure and typical for zeolitic materials in general.

According to the present invention, a zeolitic material having an LEV-type framework structure is crystallized in step (2). Said material comprises $YO_2$, wherein Y stands for any conceivable tetravalent element, Y standing for either one or several tetravalent elements. Preferred tetravalent elements according to the present invention include Si, Sn, Ti, Zr, and Ge, and combinations thereof. More preferably, Y stands for Si, Ti, or Zr, or any combination of said trivalent elements, even more preferably for Si and/or Sn. According to the present invention, it is particularly preferred that Y stands for Si.

Furthermore, according to the process of the present invention one or more sources for $YO_2$ can be provided in step (1) in any conceivable form, provided that a zeolitic material having an LEV-type framework structure comprising $YO_2$ can be crystallized in step (2). Preferably, $YO_2$ is provided as such and/or as a compound which comprises $YO_2$ as a chemical moiety and/or as a compound which (partly or entirely) is chemically transformed to $YO_2$ during the inventive process. In preferred embodiments of the present invention, wherein Y stands for Si or for a combination of Si with one or more further tetravalent elements. The source for $SiO_2$ preferably provided in step (1) can be any conceivable source. There can therefore be used, for example, all types of silicas and silicates, preferably fumed silica, silica hydrosols, reactive amorphous solid silicas, silica gel, silicic acid, water glass, sodium metasilicate hydrate, sesquisilicate or disilicate, colloidal silica, pyrogenic silica, silicic acid esters, or tetraalkoxysilanes, or mixtures of at least two of these compounds.

In preferred embodiments of the inventive process, wherein the mixture according to step (1) comprises at least one source for $SiO_2$, said source preferably comprises at least one compound selected from the group consisting of silica and silicates. Among the silicates which may be employed, alkali metal silicates are preferred, more preferably water glass, more preferably sodium and/or potassium silicate, and even more preferably sodium silicate. Among the silica which may be employed, fumed silica is preferred. According to particularly preferred embodiments the at least one source for $SiO_2$ comprises silica, preferably fumed silica.

Further preferred are embodiments wherein the zeolitic material having an LEV-type framework structure further comprises $X_2O_3$, wherein X stands for any conceivable trivalent element, X standing for either one or several trivalent elements. Preferred tetravalent elements according to the present invention include Al, B, In, and Ga, and combinations thereof. More preferably, Y stands for Al, B, or In, or any combination of said trivalent elements, even more preferably for Al and/or B. According to the present invention, it is particularly preferred that X stands for Al.

If, for example, boron is incorporated, for example free boric acid and/or borates and/or boric esters, such as, for example, triethyl borate or trimethyl borate, can be used as starting materials.

According to preferred embodiments of the present invention, wherein the zeolitic material having an LEV-type framework structure comprises $X_2O_3$, one or more sources for $X_2O_3$ is provided in step (1). In general, $X_2O_3$ can be provided in any conceivable form, provided that a zeolitic material having an LEV-type framework structure comprising $X_2O_3$ can be crystallized in step (2). Preferably, $X_2O_3$ is provided as such and/or as a compound which comprises $X_2O_3$ as a chemical moiety and/or as a compound which (partly or entirely) is chemically transformed to $X_2O_3$ during the inventive process.

In more preferred embodiments of the present invention, wherein X stands for Al or for a combination of Al with one or more further trivalent elements, the source for $Al_2O_3$ provided in step (1) can be any conceivable source. There can be used for example any type of alumina and aluminates, aluminum salts such as, for example, alkali metal aluminates, aluminum alcoholates, such as, for example, aluminum triisopropylate, or hydrated alumina such as, for example, alumina trihydrate, or mixtures thereof. Preferably, the source for $Al_2O_3$ comprises at least one compound selected from the group consisting of alumina and aluminates, preferably aluminates, more preferably alkali metal aluminates, wherein even more preferably, the alkali metal of the aluminate comprises one or more of the alkali metals M. Among the preferred alkali metal aluminates, the at least one source preferably comprises sodium and/or potassium aluminate, more preferably sodium aluminate. In particularly preferred embodiments of the present invention, the source for $Al_2O_3$ is sodium aluminate.

According to particularly preferred embodiments of the inventive process, the mixture according to step (1) comprises at least one silica as a source for $YO_2$ and at least one aluminate as a source for $X_2O_3$, more preferably at least one fumed silica and/or at least one alkali metal aluminate, wherein the alkali metal of said preferred embodiments preferably comprises sodium and/or potassium, more preferably sodium, and wherein the alkali metal even more preferably is sodium.

In preferred embodiments of the inventive process wherein the mixture according to step (1) comprises at least one source for $X_2O_3$, the $YO_2:X_2O_3$ molar ratio of the mixture can have any conceivable value, provided that a zeolitic material having an LEV-type framework structure comprising both $YO_2$ and $X_2O_3$ is crystallized in step (2). Generally, the molar ratio ranges from 0.5 to 300, preferably from 1 to 200, more preferably from 5 to 150, more preferably from 10 to 100, more preferably from 20 to 70, more preferably from 25 to 50, and even more preferably from 30 to 45

In embodiments of the present invention which are further preferred, the zeolitic material obtained and/or obtainable and/or the inventive material as such according to the inventive process comprises at least on alkali metal M, preferably sodium and/or potassium, and more preferably sodium. The alkali metal can be added at any conceivable stage of the inventive process, wherein preferably it is also added in step (1). More preferably, the entire quantity of the alkali metal comprised in the zeolitic material having an LEV-type framework structure is added in step (1) of the inventive process. In particularly preferred embodiments of the inventive process, the alkali metal is partly or entirely contained in the at least one source for $YO_2$ and/or $X_2O_3$ provided in step (1), preferably in the at least one source for $X_2O_3$.

In general, the alkali metal M can be contained in the mixture according to step (1) of the inventive process in any conceivable amount, provided that a zeolitic material having an LEV-type framework structure is crystallized in step (2). Preferably, the $M:YO_2$ molar ratio in the mixture according to step (1) ranges from 0.01 to 5, preferably from 0.05 to 2, more preferably from 0.1 to 1.5, more preferably from 0.2 to 1.2, more preferably from 0.4 to 1.0, and even more preferably from 0.65 to 0.75.

According to preferred embodiments of the inventive process, the mixture according to step (1) comprises at least one source for $X_2O_3$ and at least one alkali metal M. In general, any conceivable amounts of these components can be contained in the mixture provided that a zeolitic material having an LEV-type framework structure is crystallized in step (2). Preferably, the $YO_2:X_2O_3:M$ molar ratios in the mixture according to step (1) range from (5-65):1:(1-55), preferably from (10-60):1:(5-50), more preferably from (15-55):1:(10-45), more preferably from (25-50):1:(15-40), and even more preferably from (30-45):1:(20-35).

According to the process of the present invention, the mixture provided in step (1) can contain one or more sources for hydroxide anions $OH^-$. In general any conceivable source for $OH^-$ can be used, wherein the at least one source preferably comprises a metal hydroxide, more preferably a hydroxide of an alkali metal M, more preferably sodium and/or potassium hydroxide, and even more preferably sodium hydroxide. In preferred embodiments of the inventive process, wherein the mixture comprises a silicate as a source for $YO_2$ and/or an aluminate as a source for $X_2O_3$, it is particularly preferred that the mixture does not contain a source for $OH^-$.

In general the $OH^-:YO_2$ molar ratio of the mixture according to step (1) of the inventive process can have any conceivable value, provided that a zeolitic material having an LEV-type framework structure is crystallized in step (2). Preferably, said molar ratio ranges from 0.05 to 2, more preferably from 0.1 to 1.5, more preferably from 0.2 to 1.1, more preferably from 0.4 to 0.9, and even more preferably from 0.6 to 0.7.

According to the process of the present invention, seed crystals are provided in step (1), wherein said seed crystals comprise a zeolitic material having an LEV-type framework structure. In general, said seed crystals can comprise any zeolitic material having an LEV-type framework structure, provided that a zeolitic material having an LEV-type framework structure is crystallized in step (2). Preferably, the zeolitic material having an LEV-type framework structure comprised in the seed crystals is a zeolitic material obtained according to the inventive process. More preferably, the zeolitic material having an LEV-type framework structure comprised in the seed crystals is the same as the zeolitic material having an LEV-type framework structure which is then crystallized in step (2). Particularly preferred according to the present invention are seed crystals comprising one or more zeolites selected from the group consisting of Levyne, LZ-132, NU-3, RUB-1, ZK-20, ZSM-45, RUB-50, and mixtures of two or more thereof, wherein even more preferably the seed crystals preferably comprise RUB-50. According to an even more preferred embodiment the seed crystals comprise one or more zeolites selected from the group consisting of Levyne, LZ-132, NU-3, RUB-1, ZK-20, ZSM-45, RUB-50, and mixtures of two or more thereof, wherein said one or more zeolites have been obtained according to the inventive process, wherein even more preferably RUB-50 obtained according to the inventive process is comprised in the seed crystals.

According to the inventive process, any suitable amount of seed crystals can be provided in the mixture according to step (1), provided that a zeolitic material having an LEV-type framework structure is crystallized in step (2). In general, the amount of seed crystals contained in the mixture according to step (1) ranges from 0.01 to 30 wt.-% based on 100 wt.-% of $YO_2$ in the at least one source for $YO_2$, preferably from 0.1 to 20 wt.-%, more preferably from 0.5 to 10 wt.-%, more preferably from 2 to 8 wt.-%, and even more preferably from 4 to 6 wt.-%

In step (1) according to the present invention, the mixture can be prepared by any conceivable means, wherein mixing by agitation is preferred, preferably by means of stirring.

In preferred embodiments of the present invention, the mixture according to step (1) of the inventive process further comprises one or more solvents. Any conceivable solvents may be used in any conceivable amount, provided that a zeolitic material having an LEV-type framework structure can be crystallized in step (2). Preferably, the one or more solvents used comprise water, and more preferably distilled water. According to particularly preferred embodiments, the one or more solvents comprise water, preferably distilled water, in addition to one or more organic solvents, preferably one or more alcohols, more preferably one or more alcohols selected from the group consisting of methanol, ethanol, propanol, and mixtures thereof, more preferably methanol and/or ethanol, and even more preferably ethanol. According to said particularly preferred embodiments, it is further preferred that based on 100 wt.-% of the water and the one or more organic solvent components comprised in the solvent, said aqueous mixture contains from 0.05 to 50 wt.-% of the one or more organic solvents, preferably from 0.1 to 25 wt.-%, more preferably from 0.5 to 10 wt.-%, more preferably from 1 to 5 wt.-%, and even more preferably from 2 to 4 wt.-%.

Preferably, the solvent comprises water, wherein the $H_2O$:$YO_2$ molar ratio of the mixture ranges from 5 to 200, preferably from 10 to 100, more preferably from 20 to 50, more preferably from 25 to 45, more preferably from 30 to 40, more preferably from 33 to 38, and even more preferably from 34 to 36

In preferred embodiments of the process of the present invention, the mixture according to step (1) further comprises at one or more sources of one or more elements suitable for isomorphous substitution of at least a portion of the Y atoms and/or of the X atoms in the LEV-type framework structure. In general, any conceivable elements can be used provided that they may effectively be substituted into the LEV-type framework structure via isomorphous substitution. In preferred embodiments, the one or more elements are selected from the group consisting of B, Fe, Ti, Sn, Ga, Ge, Zr, V, Nb, Cu, Zn, Li, Be, and mixtures of two or more thereof, more preferably wherein the one or more elements are selected from the group consisting of B, Fe, Ti, Sn, Zr, Cu, and mixtures of two or more thereof, wherein even more preferably the one or more element is Ti and/or B, preferably Ti. According to further embodiments of the present invention which are particularly preferred, the one or more elements comprise Cu, wherein it is particularly preferred that the one or more element suitable for isomorphous substitution is Cu. According to yet further embodiments of the present invention which are particularly preferred, the one or more elements comprise Fe, wherein it is particularly preferred that the one or more element suitable for isomorphous substitution is Fe.

Therefore, the present invention therefore also provides a one-pot synthetic procedure for the preparation of an organotemplate-free zeolitic material having an LEV-type framework structure, preferably an organotemplate-free zeolitic material which is isomorphously substituted, wherein isomorphous substitution is not achieved by conventional processes involving the post-synthetic treatment of an existing framework, wherein framework elements are treated such that they may be replaced with other atoms which are then contained in the resulting framework structure. In particular, according to the inventive process it is not necessary to remove existing framework atoms for producing an isomorphously substituted framework structure.

Consequently, the present invention also relates to a one-pot synthetic procedure for the production of an organotemplate-free zeolitic material having an LEV-type framework structure, wherein at least a portion of the Y atoms and/or of the X atoms in the LEV-type framework structure is isomorphously substituted by one or more elements, wherein the one or more elements are preferably selected from the group consisting of B, Fe, Ti, Sn, Ga, Ge, Zr, V, Nb, Cu, Zn, Li, Be, and mixtures of two or more thereof, more preferably wherein the one or more elements are selected from the group consisting of B, Fe, Ti, Sn, Zr, Cu, and mixtures of two or more thereof, wherein even more preferably the one or more element is Ti and/or B, preferably Ti, wherein according to embodiments which are further preferred the one or more elements used for isomorphous substitution is Cu and/or Fe.

In general, according to step (1) of the inventive process, the molar ratio of $YO_2$ to the element or to the sum of the one or more elements suitable for isomorphous substitution can have any conceivable value, wherein the molar ratio preferably ranges from 3 to 300, preferably from 10 to 200, more preferably from 30 to 150, more preferably from 40 to 100, and even more preferably from 50 to 90.

In general, the single components for providing the mixture of step (1) of the inventive process can be added in any order, provided that a zeolitic material having an LEV-type framework structure is crystallized from the mixture in step (2). This may, for example, involve the addition of the optional solvent and optionally the at least one source for $X_2O_3$ and/or the at least one source for $OH^-$, followed by the addition of the at least one source for $YO_2$, wherein the seed crystals are only added to the mixture afterwards. Alternatively, the addition of the optional solvent and optionally the at least one source for $X_2O_3$ and/or the at least one source for $OH^-$ may be first followed by the addition of the seed crystals, wherein the at least one source for $YO_2$ is only added thereafter. The at least one source of at least one element suitable for isomorphous substitution optionally present in the mixture provided in step (1) may also be added at any point, provided that a zeolitic material having an isomorphously substituted LEV-type framework structure with respect to Y and/or optionally with respect to X is crystallized from the mixture in step (2). By way of example, the at least one source for isomorphous substitution may be added after the addition of the optional solvent and optionally the at least one source for $X_2O_3$ and/or the at least one source for $OH^-$, and before the addition of the at least one source for $YO_2$ and/or before the addition of the seed crystals. Alternatively, the at least one source for isomorphous substitution may be added before or after the aforementioned components of the mixture according to step (1).

In general, step (2) according to the inventive process can be conducted in any conceivable manner, provided that a zeolitic material having an LEV-type framework structure is crystallized from the mixture according to step (1). The mixture can be crystallized in any type of vessel, wherein a means of agitation is preferably employed, preferably by rotation of the vessel and/or stirring, and more preferably by stirring the mixture.

According to the inventive process, the mixture is preferably heated during at least a portion of the crystallization process in step (2). In general, the mixture can be heated to any conceivable temperature of crystallization, provided that a zeolitic material having an LEV-type framework structure is crystallized from the mixture. Preferably, the mixture is heated in step (2) to a temperature of crystallization ranging from 80 to 160° C., more preferably from 90 to 150° C., more preferably from 100 to 140° C., and even more preferably from 110 to 130° C.

The preferred heating in step (2) of the inventive process can be conducted in any conceivable manner suitable for the crystallization of a zeolitic material having an LEV-type framework structure. In general, heating may be conducted at one temperature of crystallization or vary between different temperatures. Preferably, a heat ramp is used for reaching the temperature of crystallization, wherein the heating rate preferably ranges from 10 to 100° C./h, more preferably from 20 to 70° C./h, more preferably from 25 to 60° C./h, more preferably from 30 to 50° C./h, and even more preferably from 35 to 45° C./h.

In preferred embodiments of the present invention, the mixture according to step (1) is subjected in step (2) to a pressure which is elevated with regard to normal pressure. The term "normal pressure" as used in the context of the present invention relates to a pressure of 101,325 Pa in the ideal case. However, this pressure may vary within boundaries known to the person skilled in the art. By way of example, this pressure can be in the range of from 95,000 to 106,000 or of from 96,000 to 105,000 or of from 97,000 to 104,000 or of from 98,000 to 103,000 or of from 99,000 to 102,000 Pa.

In preferred embodiments of the inventive process wherein a solvent is present in the mixture according to step (1), it is furthermore preferred that heating in step (2) is conducted under solvothermal conditions, meaning that the mixture is crystallized under autogenous pressure of the solvent which is used, for example by conducting heating in an autoclave or other crystallization vessel suited for generating solvothermal conditions. In particularly preferred embodiments wherein the solvent comprises water, preferably distilled water, heating in step (2) is accordingly preferably conducted under hydrothermal conditions.

The apparatus which can be used in the present invention for crystallization is not particularly restricted, provided that the desired parameters for the crystallization process can be realized, in particular with respect to the preferred embodiments requiring particular crystallization conditions. In the preferred embodiments conducted under solvothermal conditions, any type of autoclave or digestion vessel can be used, wherein a Teflon-lined apparatus is preferred.

In general, the duration of the crystallization process in step (2) of the inventive process is not particularly limited. In preferred embodiments involving heating of the mixture according to step (1), said crystallization process is conducted for a period ranging from 5 to 200 h, more preferably from 20 to 160 h, more preferably from 60 to 140 h, and even more preferably from 100 to 130 h According to preferred embodiments of the present invention, wherein the mixture is heated in step (2), said heating may be conducted during the entire crystallization process or during only one or more portions thereof, provided that a zeolitic material having the LEV-type framework structure is crystallized. Preferably, heating is conducted during the entire duration of crystallization.

Thus, according to a particularly preferred embodiment of the inventive process, Y stands for Si and the mixture according to step (1) further comprises at least one source for $X_2O_3$ wherein X is Al, and wherein the $SiO_2:Al_2O_3$ molar ratio of the mixture according to step (1) ranges from 0.5 to 300, preferably from 1 to 200, more preferably from 5 to 150, more preferably from 10 to 100, more preferably from 20 to 70, more preferably from 25 to 50, and even more preferably from 30 to 45. Furthermore, according to said particularly preferred embodiment, the mixture further comprises at least one source for hydroxide anions, preferably a metal hydroxide, more preferably a hydroxide of an alkali metal M, and even more preferably sodium hydroxide, wherein the $OH^-$:$SiO_2$ molar ratio of the mixture preferably ranges from 0.01 to 5, preferably from 0.05 to 2, more preferably from 0.1 to 1.5, more preferably from 0.2 to 1.1, more preferably from 0.4 to 0.9, and even more preferably from 0.6 to 0.7. In addition to this, the mixture according to said particularly preferred embodiment comprises one or more solvents, preferably water, preferably distilled water, in addition to one or more organic solvents, preferably one or more alcohols, more preferably one or more alcohols selected from the group consisting of methanol, ethanol, propanol, and mixtures thereof, more preferably methanol and/or ethanol, and even more preferably ethanol, wherein based on 100 wt.-% of the water and the one or more organic solvent components comprised in the solvent, said aqueous mixture contains from 0.05 to 50 wt.-% of the one or more organic solvents, preferably from 0.1 to 25 wt.-%, more preferably from 0.5 to 10 wt. %, more preferably from 1 to 5 wt.-%, and even more preferably from 2 to 4 wt.-% thereof, and the mixture of step (1) is crystallized under hydrothermal conditions in step (2) at a temperature ranging from 80 to 160° C., more preferably from 90 to 150° C., more preferably from 100 to 140° C., and even more preferably from 110 to 130° C., and said heating is conducted for a duration ranging from 5 to 200 h, more preferably from 20 to 160 h, more preferably from 60 to 140 h, and even more preferably from 100 to 130 h. Further preferred according to said embodiment is an $H_2O:SiO_2$ molar in the mixture according to step (1) in the range of from 5 to 200, preferably from 10 to 100, more preferably from 20 to 50, more preferably from 25 to 45, more preferably from 30 to 40, more preferably from 33 to 38, and even more preferably from 34 to 36, and an amount of seed crystals ranging from 0.01 to 30 wt.-% based on 100 wt.-% of $SiO_2$ in the at least one source for $SiO_2$, preferably from 0.1 to 20 wt.-%, more preferably from 0.5 to 10 wt.-%, more preferably from 2 to 8 wt.-%, and even more preferably from 4 to 6 wt.-%.

In general, the process of the present invention can optionally comprise further steps for the work-up and/or further physical and/or chemical transformation of the zeolitic material having an LEV-type framework structure crystallized in step (2) from the mixture provided in step (1). The crystallized material can for example be subject to any sequence of isolation and/or washing procedures, wherein the zeolitic material obtained from crystallization in step (2) is preferably subject to at least one isolation and at least one washing procedure.

Isolation of the crystallized product can be achieved by any conceivable means. Preferably, isolation of the crystallized product can be achieved by means of filtration, ultrafiltration, diafiltration, centrifugation and/or decantation methods, wherein filtration methods can involve suction and/or pressure filtration steps.

With respect to one or more optional washing procedures, any conceivable solvent can be used. Washing agents which may be used are, for example, water, alcohols, such as methanol, ethanol or propanol, or mixtures of two or more thereof. Examples of mixtures are mixtures of two or more alcohols, such as methanol and ethanol or methanol and propanol or ethanol and propanol or methanol and ethanol and propanol, or mixtures of water and at least one alcohol, such as water and methanol or water and ethanol or water and propanol or water and methanol and ethanol or water and methanol and propanol or water and ethanol and propanol or water and methanol and ethanol and propanol. Water or a mixture of water and at least one alcohol, preferably water and ethanol, is preferred, distilled water being very particularly preferred as the only washing agent.

Preferably, the separated zeolitic material is washed until the pH of the washing agent, preferably the washwater, is in the range of from 6 to 8, preferably from 6.5 to 7.5, as determined via a standard glass electrode.

Furthermore, the inventive process can optionally comprise one or more drying steps. In general, any conceivable means of drying can be used. Drying procedures preferably include heating and/or applying vacuum to the zeolitic material having an LEV-type framework structure. In envisaged embodiments of the present invention, one or more drying steps may involve spray drying, preferably spray granulation of the zeolitic material.

In embodiments which comprise at least one drying step, the drying temperatures are preferably in the range of from 25° C. to 150° C., more preferably of from 60 to 140° C., more preferably of from 70 to 130° C. and even more preferably in the range of from 75 to 125° C. The durations of drying are preferably in the range of from 2 to 60 h, more preferably in the range of 6 to 48 hours, and even more preferably of from 12 to 24 h.

According to the inventive process, the zeolitic material crystallized in step (2) can optionally be subject to at least one step of an ion-exchange procedure, wherein the term "ionexchange" according to the present invention generally refers to non-framework ionic elements and/or molecules contained in the zeolitic material. Preferably, the non-framework ionic element comprises one or more of the one or more alkali metals M preferably comprised in the zeolitic material haven an LEV-type framework structure.

In general, any conceivable ion-exchange procedure with all possible ionic elements and/or molecules can be conducted on the zeolitic material, with the exception of organic structure directing agents specifically used in the synthesis of zeolitic materials having an LEV-type framework structure, in particular specific tetraalkylammonium salts and/or related organotemplates such as 1-methyl-1-azonia-4-azabicyclo[2.2.2]octane and/or N-methylquinuclidinium salts and/or diethyldimethylammonium salts. Preferably, as ionic elements at least one cation and/or cationic element is employed which is preferably selected from the group consisting of $H^+$, $NH_4^+$, Sr, Zr, Cr, Fe, Co, Ni, Cu, Zn, Ru, Rh, Pd, Ag, Os, Ir, Pt, Au, and mixtures of two or more thereof, more preferably from the group consisting of $H^+$, $NH_4^+$, Sr, Cr, Fe, Co, Ni, Cu, and mixtures of two or more thereof, and even more preferably from the group consisting of $H^+$, $NH_4^+$, Fe, Cu, and mixtures of two or more thereof. Preferably, the zeolitic material is first ion-exchanged with $H^+$ and/or $NH_4^+$, and more preferably with $NH_4^+$, before being subject to a further ion-exchange procedure, more preferably before being subject to ion-exchange with at least one cation and/or cationic element selected from the group consisting Sr, Zr, Cr, Fe, Co, Ni, Cu, Zn, Ru, Rh, Pd, Ag, Os, Ir, Pt, Au, and mixtures of two or more thereof, more preferably from the group consisting of Sr, Cr, Fe, Co, Ni, Cu, and mixtures of two or more thereof, wherein even more preferably the at least one action and/or cationic element comprises or preferably consists of Cu and/or Fe.

In general, the optional washing and/or isolation and/or ion-exchange procedures comprised in the inventive process can be conducted in any conceivably order and repeated as often as desired.

Therefore, the process according to the present invention optionally comprises one or more of the following steps of (3) isolating the zeolitic material having an LEV-type framework structure, preferably by filtration, and/or (4) washing the zeolitic material having an LEV-type framework structure, and/or (5) drying the zeolitic material having an LEV-type framework structure, and/or (6) subjecting the zeolitic material having an LEV-type framework structure to an ion-exchange procedure, wherein the steps (3) and/or (4) and/or (5) and/or (6) can be conducted in any order, and wherein at least one of said steps is preferably repeated one or more times.

Preferably, the inventive process comprises at least one step of isolating the zeolitic material crystallized according to step (2), more preferably by filtration thereof. According to the inventive process it is further preferred that after the at least one step of isolating, the zeolitic material is subject to at least one step of drying, wherein more preferably the zeolitic material is subject to at least one step of washing prior to the at least one drying step. In a particularly preferred embodiment, the zeolitic material crystallized according to step (2) is subject to at least one step of isolating, followed by at least one step of washing, followed by at least one step of drying.

According to a further embodiment of the inventive process, the zeolitic material crystallized in step (2) is directly subject to at least one step of drying, preferably to spray drying and or spray granulation, without isolating, washing, or drying of the zeolitic material beforehand. Directly subjecting the mixture obtained from step (2) of the inventive process to a spray drying or spray granulation stage has the advantage that isolation and drying is performed in a single stage. Consequently, according to this embodiment of the present invention, an even more preferred process is provided wherein not only removal of organotemplate compounds is avoided, but also the number of post-synthesis workup steps is minimized, as a result of which the organotemplate-free zeolitic material having an LEV-type framework structure can be obtained from a highly simplified process.

According to a further embodiment of the present invention, the zeolitic material obtained from crystallization in step (2) is subject to at least one isolating step prior to being subject to at least one ion-exchange procedure, preferably to at least one isolating step followed by at least one washing step, and more preferably to at least one isolating step followed by at least one washing step followed by at least one drying step.

In the process of the present invention, it is preferred that a calcination step is not employed. In general, a calcination step involves the heating of the zeolitic material crystallized according to step (2) above a temperature of 500° C. More preferably, a process according to the present invention for the production of a zeolitic material having an LEV-type framework structure which does not comprise a calcination step refers to processes, wherein the zeolitic material crystallized according to step (2) is not subject in a subsequent step to a temperature exceeding 450° C., more preferably 350° C., more preferably 300° C., more preferably 250° C., more preferably 200° C., and even more preferably 150° C. According to the present invention it is particularly preferred that after completion of step (2) of the inventive process, wherein the crystallized zeolitic material is at ambient temperature, said material is subsequently not subject to any heating process normally or suitably conducted for removal of organotemplates form a zeolitic material having an LEV-type framework structure. Within the meaning of the present invention, a zeolitic material which is "non-calcined" is one which has not been subject to any one of the aforementioned calcination procedures.

In general, the zeolitic material having an LEV-type framework structure obtained according to the inventive process may be any conceivable zeolite of the LEV framework type. According to preferred embodiments, the zeolitic material having an LEV-type framework structure formed in step (2) comprises one or more zeolites selected from the group consisting of Levyne, LZ-132, NU-3, RU B-1, ZK-20, ZSM-45, RUB-50, and mixtures of two or more thereof, wherein the zeolitic material preferably comprises the zeolitic material comprises RUB-50.

The present invention furthermore relates to a synthetic organotemplate-free zeolitic material having an LEV-type framework structure which is either obtained by the process according to the present invention or by any conceivable process which leads to a zeolitic material having an LEV-type framework structure as obtainable according to the inventive process. According to particularly preferred embodiments, the synthetic organotemplate-free zeolitic material having an LEV-type framework structure is a non-calcined zeolitic material which is either obtained by the process according to the present invention or by any conceivable process which leads to a zeolitic material having an LEV-type framework structure as obtainable according to the inventive process. Within the meaning of the present invention, a material which is designated as a "synthetic" material does not signify that the designated material as such may not naturally occur in nature. In particular, a "synthetic" material only indicates that it is man-made, but by no means excludes that the material as such may occur naturally. Therefore, by way of example, the present invention also relates to a synthetic Levyne. In this respect, it is herewith further noted that within the meaning of the present invention, the term "organotemplate-free zeolitic material" is synonymous to "synthetic organotemplate-free zeolitic material".

Therefore, the present invention also relates to a synthetic organotemplate-free zeolitic material having an LEV-type framework structure which is obtainable and/or obtained according to the inventive process.

Furthermore, the present invention also relates to a synthetic organotemplate-free zeolitic material as such having an LEV-type framework structure comprising $YO_2$ and optionally comprising $X_2O_3$, wherein Y is a tetravalent element, and X is a trivalent element, wherein said zeolitic material is preferably non-calcined. According to preferred embodiments, the zeolitic material comprises one or more alkali metals M. According to further preferred embodiments, Y is selected from the group consisting of Si, Sn, Ti, Zr, Ge, and mixtures of two or more thereof, Y preferably being Si. Furthermore, in preferred embodiments comprising $X_2O_3$, it is further preferred that X is selected from the group consisting of Al, B, In, Ga, and mixtures of two or more thereof, X preferably being Al and/or B, and more preferably being Al.

Within the meaning of the present invention, unless otherwise specified, the term "organotemplate-free zeolitic material" as used for referring to the organotemplate-free zeolitic material according to embodiments and preferred embodiments of the present invention designates both the organotemplate-free zeolitic material having an LEV-type framework structure which is obtainable and/or obtained according to the inventive process as well as the organotemplate-free zeolitic material as such having an LEV-type framework structure comprising $YO_2$ and optionally comprising $X_2O_3$, wherein Y is a tetravalent element, and X is a trivalent element, wherein said zeolitic material is preferably non-calcined.

According to preferred embodiments of the present invention, the organotemplate-free zeolitic material having an LEV-type framework structure has an X-ray diffraction pattern comprising at least the following reflections:

| Intensity (%) | Diffraction angle 2θ/° [Cu K(alpha 1)] |
|---|---|
| [37-53] | [10.85-11.05] |
| [23-50] | [13.20-13.45] |
| [40-50] | [20.85-21.25] |
| 100 | [21.75-22.05] |
| [39-69] | [28.35-28.90] |
| [55-94] | [31.90-32.35] |
| [11-34] | [51.30-51.60] |
| [6-30] | [55.00-55.80] | wherein 100% relates to the intensity of the maximum peak in the X-ray powder diffraction pattern, and wherein the zeolitic material is preferably non-calcined.

Preferably, the organotemplate-free zeolitic material having an LEV-type framework structure has an X-ray diffraction pattern comprises at least the following reflections:

| Intensity (%) | Diffraction angle 2θ/° [Cu K(alpha 1)] |
|---|---|
| [37-53] | [10.90-11.05] |
| [23-50] | [13.25-13.45] |
| [40-50] | [20.90-21.20] |
| 100 | [21.80-22.00] |
| [39-69] | [28.45-28.80] |
| [55-94] | [32.00-32.30] |
| [11-34] | [51.35-51.55] |
| [6-30] | [55.10-55.70] | wherein 100% relates to the intensity of the maximum peak in the X-ray powder diffraction pattern, and wherein the zeolitic material is preferably non-calcined.

Within the meaning of the present invention, an "organotemplate-free" zeolitic material relates to a zeolitic material which is substantially free of organotemplate materials, wherein "substantially" as employed in the present invention with respect to the amount of one or more organotemplates contained in the zeolitic material indicates an amount of 0.001 wt.-% or less of one or more organotemplates, preferably 0.0005 wt.-% or less, more preferably 0.00001 wt.-% or less, more preferably 0.000005 wt.-% or less, and even more preferably 0.000001 wt.-% or less thereof. Said amounts of one or more organotemplates, if at all present in the zeolitic material, may also be denoted as "impurities" or "trace amounts" within the meaning of the present invention.

According to the present invention, the zeolitic material does not contain more than an impurity of an organic structure directing agent specifically used in the synthesis of zeolitic materials having an LEV-type framework structure, in particular specific tetraalkylammonium salts and/or related organotemplates such as 1-methyl-1-azonia-4-azabicyclo[2.2.2]octane, N-methylquinuclidinium salts and/or diethyldimethylammonium salts. Such an impurity can, for example, be caused by organic structure directing agents still present in seed crystals used in the inventive process.

According to the present invention, the synthetic organotemplate-free zeolitic material having an LEV-type framework is preferably non-calcined, wherein, with the exception of the conditions in which it is crystallized, the zeolitic material having an LEV-type framework structure according to the present invention has not been subject to a heating process normally or suitably conducted for removal of organotemplates form a zeolitic material having an LEV-type framework structure.

In preferred embodiments of the present invention, the $YO_2:X_2O_3$ molar ratio of the organotemplate-free zeolitic material ranges from 2 to 100, preferably from 3 to 20, more preferably from 4 to 15, more preferably from 5 to 9, more preferably from 6 to 7.5, and even more preferably from 6.25 to 7.25.

According to preferred embodiments of the present invention, wherein the organotemplate-free zeolitic material comprises one or more alkali metals M as non-framework elements, the molar ratio $M:X_2O_3$ preferably ranges from 0.005 to 10, preferably from 0.05 to 7, more preferably from 0.5 to 6, more preferably from 1 to 5, more preferably from 1.5 to 4.5, and even more preferably from 2 to 4.

According to the present invention it is further preferred that when the organotemplate-free zeolitic material comprises one or more alkali metals M as non-framework elements, the molar ratio $M:X_2O_3$ preferably ranges from 0.001 to 3, more preferably from 0.01 to 2, more preferably from 0.05 to 1, more preferably from 0.1 to 0.7, and even more preferably from 0.2 to 0.5.

In preferred embodiments of the present invention, the zeolitic material comprises sodium and/or potassium, wherein at least part of said sodium and/or potassium is comprised in the one or more alkali metals M preferably present in the material a non-framework elements.

According to preferred embodiments, at least a portion of the alkali metals M optionally present in the zeolitic material having an LEV-type framework structure are substituted by one or more cation and/or cationic element. In general, any cation and/or cationic element may substitute the alkali metals M, wherein cations and/or cationic elements are preferred which are suited for ion-exchange in the zeolitic material, with the exception of organic structure directing agents specifically used in the synthesis of zeolitic materials having an LEV-type framework structure, in particular specific tetraalkylammonium salts and/or related or ganotemplates such as 1-methyl-1-azonia-4-azabicyclo[2.2.2]octane, N-methylquinuclidinium salts and/or diethyldimethylammonium salts.

Preferably, the one or more cation and/or cationic element is selected from the group consisting of $H^+$, $NH_4^+$, Sr, Zr, Cr, Fe, Co, Ni, Cu, Zn, Ru, Rh, Pd, Ag, Os, Ir, Pt, Au, and mixtures of two or more thereof, more preferably from the group consisting of $H^+$, $NH_4^+$, Sr, Cr, Fe, Co, Ni, Cu, and mixtures of two or more thereof, and even more preferably from the group consisting of $H^+$, $NH_4^+$, Fe, Cu, and mixtures of two or more thereof. According to particularly preferred embodiments of the present invention, the one or more cation comprises Cu and/or Fe, Cu being even more preferred.

According to preferred embodiments of the present invention, at least a portion of the Y atoms in the LEV-type framework is isomorphously substituted by one or more element. In general, Y can be isomorphously substituted by any suitable element, wherein the one or more element is preferably selected from the group consisting of B, Fe, Ti, Sn, Ga, Ge, Zr, V, Nb, Cu, Zn, Li, Be, and mixtures of two or more thereof, more preferably wherein the one or more elements are selected from the group consisting of B, Fe, Ti, Sn, Zr, Cu, and mixtures of two or more thereof, wherein even more preferably the one or more element is Ti and/or B, preferably Ti. According to further embodiments of the present invention which are particularly preferred, the one or more element comprises Cu, wherein it is particularly preferred that the one or more element is Cu. According to yet further embodiments of the present invention which are particularly preferred, the one or more element comprises Fe, wherein it is particularly preferred that the one or more element is Fe.

In general, there is no particular restriction according to the present invention as to the portion of the Y atoms which may be isomorphously substituted in the LEV-type framework of the preferred organotemplate-free zeolitic material. According to preferred embodiments, the molar ratio of $YO_2$ to the one or more element ranges from 5 to 100, preferably from 10 to 80, more preferably from 20 to 70, and even more preferably from 25 to 65.

According to the present invention, the organotemplate-free zeolitic material having an LEV-type framework structure preferably has a BET surface area determined according to DIN 66135 of from 50 to 700 $m^2/g$, preferably from 100 to 650 $m^2/g$, more preferably from 200 to 600 $m^2/g$, more preferably from 300 to 550 $m^2/g$, and even more preferably from 340 to 520 $m^2/g$. In particular, it is particularly preferred according to the present invention that the or ganotemplate-free zeolitic material having said preferred BET surface areas is a non-calcined zeolitic material.

Therefore, as described above, the organotemplate-free zeolitic material according to the present invention may comprise one or more of any zeolites having an LEV-type framework structure, provided that said one or more zeolites contain $YO_2$, wherein $YO_2$ is preferably at least in part contained as a framework element therein. According to preferred embodiments of the present invention, the organotemplate-free zeolitic material comprises one or more zeolites selected from the group consisting of Levyne, LZ-132, NU-3, RUB-1, ZK-20, ZSM-45, RUB-50, and mixtures of two or more thereof, wherein it is particularly preferred that the zeolitic material comprises RUB-50.

Depending on the specific needs of its application, the inventive material can be employed as such, like in the form of a powder, a spray powder or a spray granulate obtained from above-described separation techniques, e.g. decantation, filtration, centrifugation, or spraying.

In many industrial applications, it is often desired on the part of the user not to employ the zeolitic material as powder or sprayed material, i.e. the zeolitic material obtained by the separation of the material from its mother liquor, optionally including washing and drying, and subsequent calcination, but a zeolitic material which is further processed to give moldings. Such moldings are required particularly in many industrial processes, e.g. in many processes wherein the zeolitic material of the present invention is employed as catalyst or adsorbent.

Accordingly, the present invention also relates to a molding comprising the zeolitic material of the present invention having an LEV-type framework structure.

In general, the powder or sprayed material can be shaped without any other compounds, e.g. by suitable compacting, to obtain moldings of a desired geometry, e.g. tablets, cylinders, spheres, or the like.

Preferably, the powder or sprayed material is admixed with or coated by a suitable refractory binder. In general, suitable binders are all compounds which impart adhesion and/or cohesion between the zeolitic material particles to be bonded which goes beyond the physisorption which may be present without a binder. Examples of such binders are metal oxides, such as, for example, $SiO_2$, $Al_2O_3$, $TiO_2$, $ZrO_2$ or MgO or clays, or mixtures of two or more of these compounds. Naturally occurring clays which can be employed include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. In addition, the zeolitic material according to the present invention can be composited with a porous matrix material such as silica-alumina, silica-magnesia, silica-zirconia, silica-thoria, silica-beryllia and silica-titania as well as ternary compositions such as silica-alumina-thoria, silica-alumina-zirconia, silica-alumina-magnesia and silica-magnesiazirconia.

The catalysts of the present invention may therefore also be provided in the form of extrudates, pellets, tablets or particles of any other suitable shape, for use as a packed bed of particulate catalyst, or as shaped pieces such as plates, saddles, tubes, or the like.

Also preferably, the powder or the sprayed material, optionally after admixing or coating by a suitable refractory binder as described above, is formed into a slurry, for example with water, which is deposited upon a suitable refractory carrier. The slurry may also comprise other compounds such as, e.g., stabilizers, defoamers, promotors, or the like. Typically, the carrier comprises a member, often referred to as a "honeycomb" carrier, comprising one or more refractory bodies having a plurality of fine, parallel gas flow passages extending therethrough. Such carriers are well known in the art and may be made of any suitable material such as cordierite or the like.

In general, the zeolitic material described above can be used as molecular sieve, adsorbent, catalyst, catalyst support or binder thereof. For example, the zeolitic material can be used as molecular sieve to dry gases or liquids, for selective molecular separation, e.g. for the separation of hydrocarbons or amides; as ion exchanger; as chemical carrier; as adsorbent, in particular as adsorbent for the separation of hydrocarbons or amides; or as a catalyst. Most preferably, the zeolitic material according to the present invention is used as a catalyst and/or as a catalyst support.

According to a preferred embodiment of the present invention, the organotemplate-free zeolitic material of the invention is used in a catalytic process, preferably as a catalyst and/or catalyst support, and more preferably as a catalyst. In general, the zeolitic material of the invention can be used as a catalyst and/or catalyst support in any conceivable catalytic process, wherein processes involving the conversion of at least one organic compound is preferred, more preferably of organic compounds comprising at least one carbon-carbon and/or carbon-oxygen and/or carbon-nitrogen bond, more preferably of organic compounds comprising at least one carbon-carbon and/or carbon-oxygen bond, and even more preferably of organic compounds comprising at least one carbon-carbon bond. In particularly preferred embodiments of the present invention, the zeolitic material is used as a catalyst and/or catalyst support in a fluid catalytic cracking (FCC) process.

According to a further embodiment of the present invention, the zeolitic material of the invention is preferably used in a catalytic process involving the conversion of at least one compound comprising at least one nitrogen-oxygen bond. Particularly preferred according to the present invention is the use of the zeolitic material having an LEV-type framework structure as a catalyst and/or catalyst support in a selective catalytic reduction (SCR) process for the selective reduction of nitrogen oxides $NO_R$; for the oxidation of $NH_3$, in particular for the oxidation of $NH_3$ slip in diesel systems; for the decomposition of $N_2O$. The term nitrogen oxides, $NO_R$, as used in the context of the present invention designates the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), nitrogen peroxide ($NO_3$). According to particularly preferred embodiments of the present invention, the organotemplate-free zeolitic material used in a catalytic process involving the conversion of at least one compound comprising at least one nitrogen-oxygen bond comprises Cu and/or Fe, and more preferably Cu.

Therefore, the present invention also relates to a method for selectively reducing nitrogen oxides $NO_R$ by contacting a stream containing $NO_R$ with a catalyst containing the zeolitic material having an LEV-type framework structure according to the present invention under suitable reducing conditions; to a method of oxidizing $NH_3$, in particular of oxidizing $NH_3$ slip in diesel systems, by contacting a stream containing $NH_3$ with a catalyst containing the zeolitic material having an LEV-type framework structure according to the present invention under suitable oxidizing conditions; to a method of decomposing of $N_2O$ by contacting a stream containing $N_2O$ with a catalyst containing the zeolitic material having an LEV-type framework structure according to the present invention under suitable decomposition conditions; to a method of controlling emissions in Advanced Emission Systems such as Homogeneous Charge Compression Ignition (HCCI) engines by contacting an emission stream with a catalyst containing the zeolitic material having an LEV-type framework structure according to the present invention under suitable conditions; to a fluid catalytic cracking FCC process wherein the zeolitic material having an LEV-type framework structure according to the present invention is employed as additive; to a method of converting an organic compound by contacting said compound with a catalyst containing the zeolitic material having an LEV-type framework structure according to the present invention under suitable conversion conditions; to a "stationary source" process wherein a catalyst is employed containing the zeolitic material having an LEV-type framework structure according to the present invention.

Therefore, the present invention also relates to a method for selectively reducing nitrogen oxides $NO_R$, wherein a gaseous stream containing nitrogen oxides $NO_R$, preferably also containing ammonia and/urea, is contacted with the zeolitic material according to the present invention or the zeolitic material obtainable of obtained according to the present invention, preferably in the form of a molded catalyst, still more preferably as a molded catalyst wherein the zeolitic material is deposited on a suitable refractory carrier, still more preferably on a "honeycomb" carrier.

The nitrogen oxides which are reduced using a catalyst containing the zeolitic material according to the present invention or the zeolitic material obtainable of obtained according to the present invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogeneous materials may be mentioned.

Most preferably, the zeolitic material according to the present invention or the zeolitic material obtainable of obtained according to the present invention is used as a molded catalyst, still more preferably as a molded catalyst wherein the zeolitic material is deposited on a suitable refractory carrier, still more preferably on a "honeycomb" carrier, for the selective reduction of nitrogen oxides $NO_R$, i.e. for selective catalytic reduction of nitrogen oxides. In particular, the selective reduction of nitrogen oxides wherein the zeolitic material according to the present invention is employed as catalytically active material is carried out in the presence ammonia or urea. While ammonia is the reducing agent of choice for stationary power plants, urea is the reducing agent of choice for mobile SCR systems. Typically, the SCR system is integrated in the engine and vehicle design and, also typically, contains the following main components: SCR catalyst containing the zeolitic material according to the present invention; a urea storage tank; a urea pump; a urea dosing system; a urea injector/nozzle; and a respective control unit.

Furthermore, it is preferred according to the present invention that the organotemplate-free zeolitic material is used as a molecular trap for organic compounds. In general, any type of organic compound may be trapped in the zeolitic material, wherein it is preferred that the compound is reversibly trapped, such that it may be later released from the zeolitic material, preferably wherein the organic compound is released—preferably without conversion thereof—by an increase in temperature and/or a decrease in pressure. Furthermore, it is preferred that the zeolitic material is used to trap organic compounds of which the dimensions allow them to penetrate the microporous system of the molecular structure. According to yet further embodiments of the present invention, it is preferred that the trapped compounds are released under at least partial conversion thereof to a chemical derivative and/or to a decomposition product thereof, preferably to a thermal decomposition product thereof.

When preparing specific catalytic compositions or compositions for different purposes, it is also conceivable to blend the zeolitic material according to the present invention having an LEV-type framework structure with at least one other catalytically active material or a material being active with respect to the intended purpose. It is also possible to blend at least two different inventive materials which may differ in the $YO_2:X_2O_3$ ratio, preferably in the $SiO_2:Al_2O_3$ ratio, and/or in the presence or absence of one or more further metals such as one or more transition metals and/or in the specific amounts of a further metal such as a transition metal, wherein according to particularly preferred embodiments, the one or more transition metal comprises Cu and/or Fe, more preferably Cu. It is also possible to blend at least two different inventive materials with at least one other catalytically active material or a material being active with respect to the intended purpose.

Also, the catalyst may be disposed on a substrate. The substrate may be any of those materials typically used for preparing catalysts, and will usually comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is disposed as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 400 or more gas inlet openings (i.e., cells) per square inch (2.54 cm×2.54 cm) of cross section.

The substrate can also be a wall-flow filter substrate, where the channels are alternately blocked, allowing a gaseous stream entering the channels from one direction (inlet direction), to flow through the channel walls and exit from the channels from the other direction (outlet direction). The catalyst composition can be coated on the flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, alpha-alumina, an aluminosilicate, and the like.

The substrates useful for the catalysts of embodiments of the present invention may also be metallic in nature and be composed of one or more metals or metal alloys. The metallic substrates may be employed in various shapes such as corrugated sheet or monolithic form. Suitable metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium, and the like. The surface or the metal substrates may be oxidized at high temperatures, e.g., 1000° C. and higher, to improve the resistance to corrosion of the alloys by forming an oxide layer on the surfaces of the substrates. Such high temperature-induced oxidation may enhance the adherence of the refractory metal oxide support and catalytically promoting metal components to the substrate.

In alternative embodiments, zeolitic material according to the present invention having an LEV-type framework structure may be deposited on an open cell foam substrate. Such substrates are well known in the art, and are typically formed of refractory ceramic or metallic materials.

Especially preferred is the use of a catalyst containing the zeolitic material according to the present invention or the zeolitic material obtainable or obtained according to the present invention for removal of nitrogen oxides $NO_x$ from exhaust gases of internal combustion engines, in particular diesel engines, which operate at combustion conditions with air in excess of that required for stoichiometric combustion, i.e., lean.

Therefore, the present invention also relates to a method for removing nitrogen oxides $NO_x$ from exhaust gases of internal combustion engines, in particular diesel engines, which operate at combustion conditions with air in excess of that required for stoichiometric combustion, i.e., at lean conditions, wherein a catalyst containing the zeolitic material according to the present invention or the zeolitic material obtainable or obtained according to the present invention is employed as catalytically active material.

The present invention therefore relates to the use of the organotemplate-free zeolitic material of the invention, in particular in the field of catalysis and/or in the treatment of exhaust gas, wherein said exhaust gas treatment comprises industrial and automotive exhaust gas treatment. In these and other applications, the zeolitic material of the present invention can by way of example be used as a molecular sieve, catalyst, and/or catalyst support.

In embodiments of the present invention involving the use of the zeolitic material of the invention in exhaust gas treatment, the zeolitic material is preferably used in the treatment of industrial or automotive exhaust gas, more preferably as a molecular sieve in said applications. In a particularly preferred embodiment, the zeolitic material used in exhaust gas treatment is comprised in a hydrocarbon trap.

DESCRIPTION OF THE FIGURES

The powder X-ray diffraction patterns displayed in the figures were recorded on a Siemens D-5000 with monochromatic Cu K alpha-1 radiation, a capillary sample holder being used in order to avoid a preferred orientation. The diffraction data were collected using a positionsensitive detector from Braun, in the range from 8 to 96° (2 theta) and with a step width of 0.0678°. Indexing of the powder diagram was effected using the program Treor90, implemented in powder-X (Treor90 is a public domain program which is freely accessible via the URL http://www.ch.iucr.org/sincris-top/logiciel/). In the figure, the angle 2 theta in ° is shown along the abscissa and the intensities are plotted along the ordinate.

EXAMPLES

Example 1

Seed-Directed Synthesis of an LEV-Type Zeolite 1390.6 g of distilled water were weighed into a plastic beaker, together with 57.4 g of NaOH and 11.8 g of $NaAlO_2$. The mixture was then stirred for 30 min to afford a clear solution. 132.4 g of fumed silica (Aerosil 200) were then added in portions while stirring. 101.2 g of ethanol were then added and the mixture was stirred for 5 hours affording an alumina silicate gel with a molar ratio of $32SiO_2:1Al_2O_3:23Na:1104H_2O:31EtOH$. 6.6 g of RUB-50 seed crystals (Si:Al≈13) were then added to the mixture which was stirred for an additional 5 min to afford a thick slurry as the reaction mixture.

The gel mixture was then transferred to an autoclave and crystallized at 120° C. for 96 hours (4 days). After having let the reaction mixture cool to room temperature, it was filtered over a glass frit and the solid residue washed with 4 l of distilled water. The solid product was then transferred to a porcelain receptacle and dried therein at 120° C. for 16 hours, thus affording 38.2 g of a white powder having a crystallinity grade of 95%, wherein the microcrystalline product displayed a mean diameter of the crystallites of 73 nm.

Figure 1A:
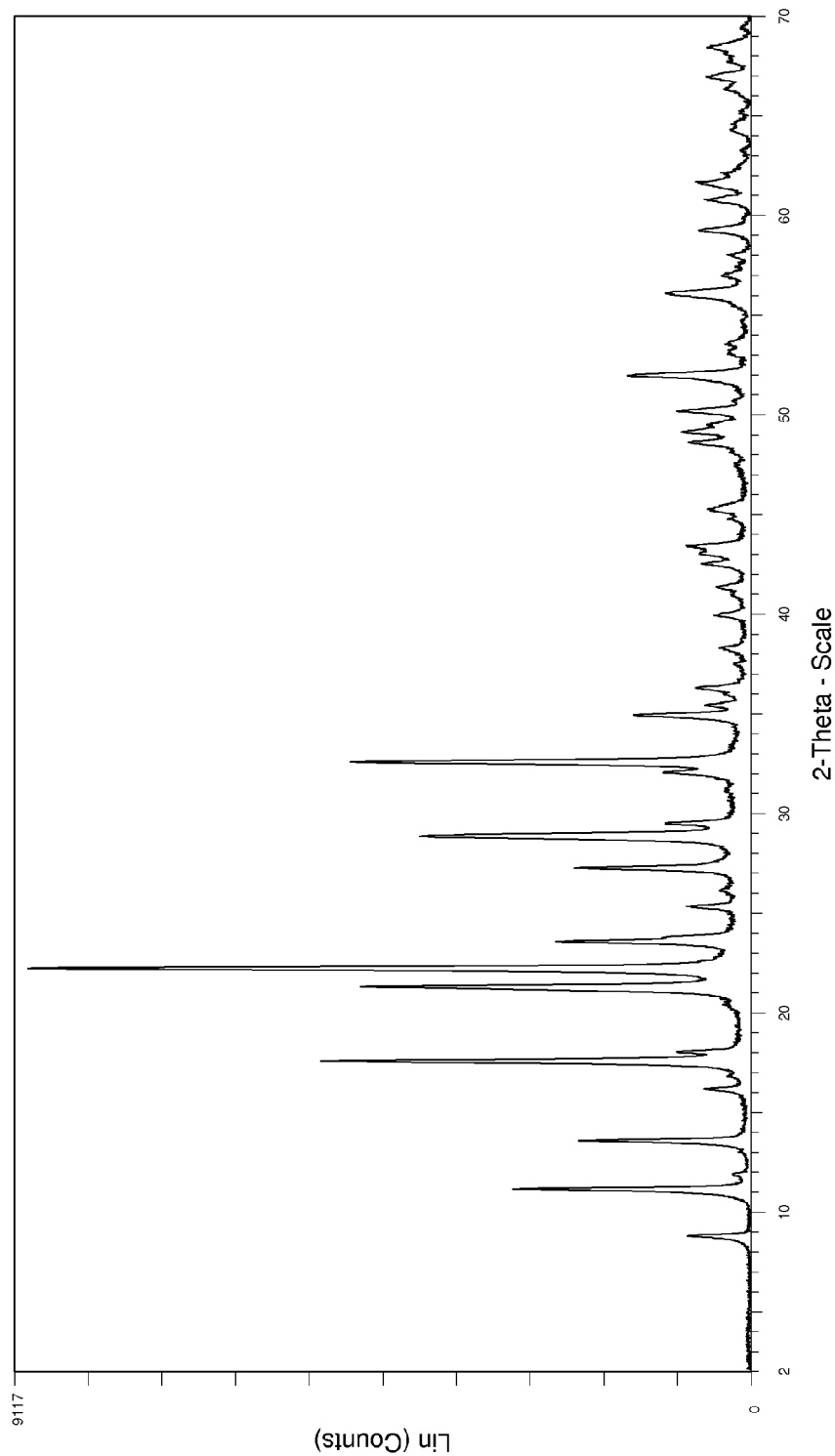
FIGS. 1A and 1B, 2A, 2B, 3A and 3B, 3C, 4A, 4B, 5A, 5B, 6A, 6B, 7A, 7B, 8A, 8B, and 8C show the X-ray diffraction pattern of the crystalline material obtained according to Examples 1, 2A, 2B, 3A, 3B, 4A, 4B, 5A, 5B, 6A, 6B, 7A, 7B, 8A, 8B, and 8C, respectively.

In FIG. 1A, the XRD of the RUB-50 seed material is displayed, having the LEV-type zeolite framework structure.

Figure 1B:
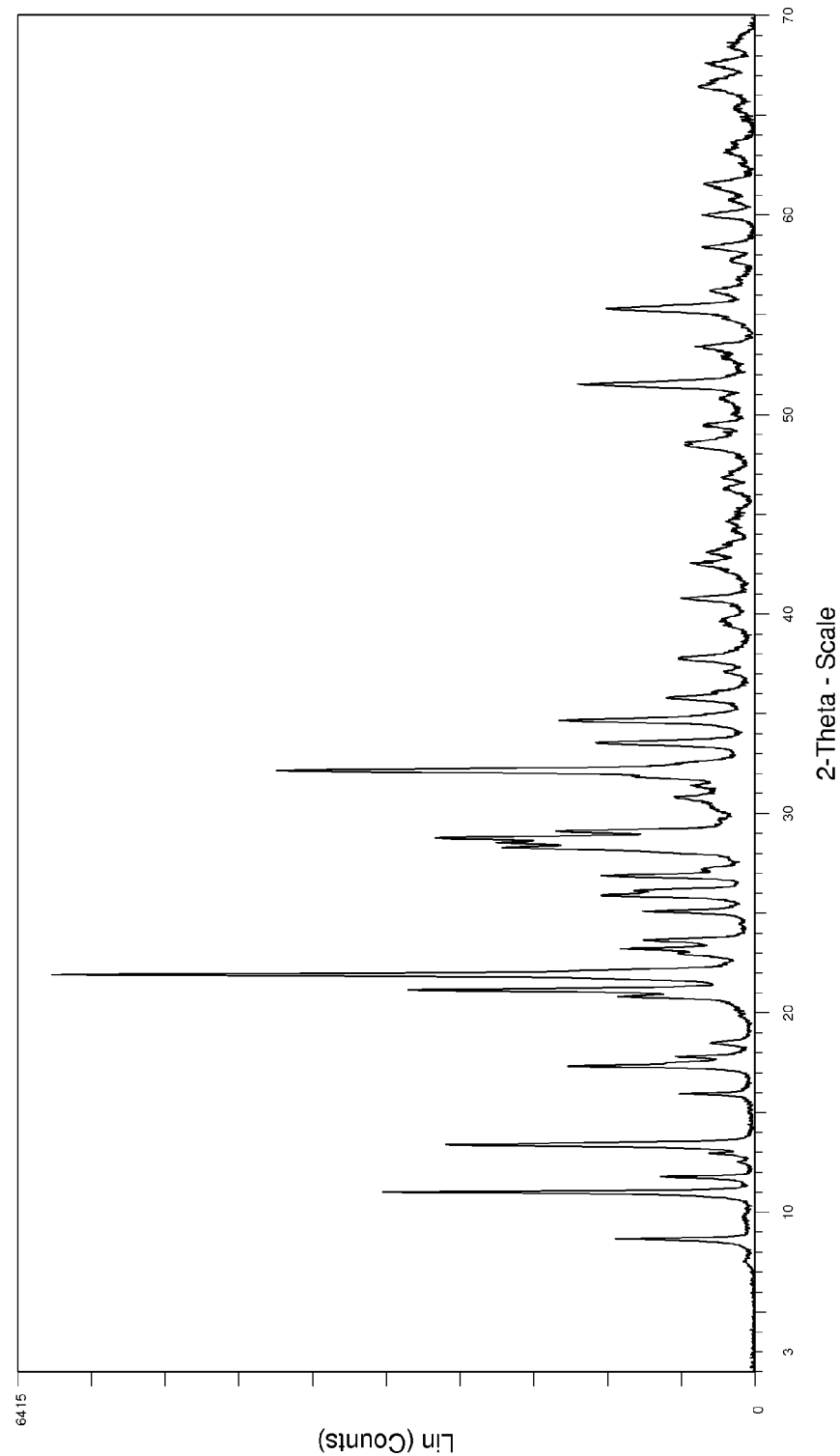

FIG. 1B shows the XRD of the crystalline product obtained from the organotemplate-free synthesis of Example 1. In particular, the XRD reflection pattern of the microcrystalline product reveals an LEV-type zeolite framework structure.

Example 2A

The synthetic procedure described in Example 1 was repeated, wherein the reaction in the autoclave at 120° C. was conducted for a period of 120 hours (5 days). After working up of the solid residue as outlined in Example 1, 35.7 g of a white microcrystalline material were obtained.

Figure 2A:
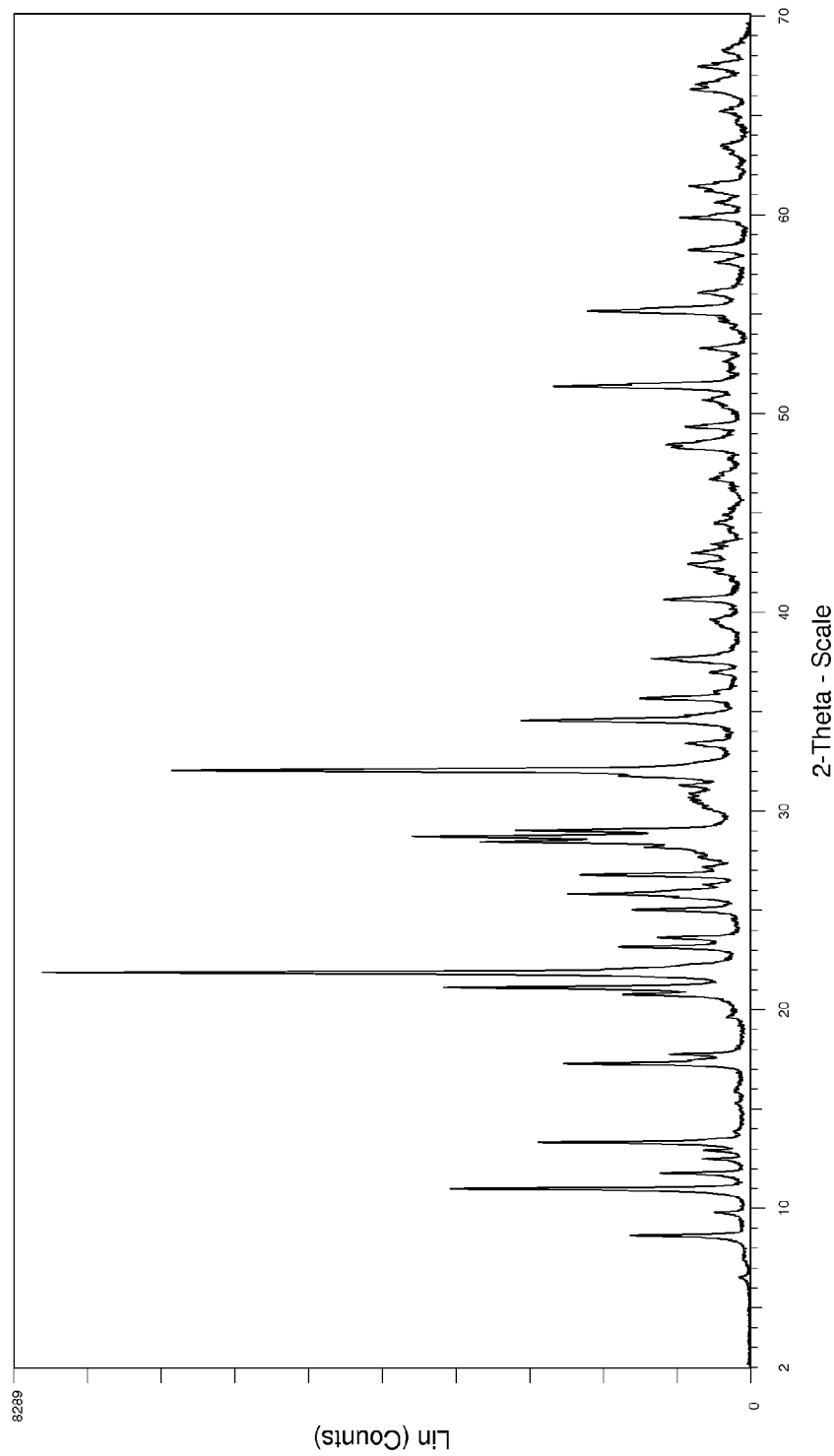

In FIG. 2A, the XRD of the crystalline product obtained according to Example 2A is displayed, wherein a reflection pattern typical for an LEV-type zeolite framework structure is apparent.

Example 2B

Ion-Exchange of the LEV-Type Zeolite of Example 2A 293 g of distilled water were weighed into a four-neck flask to which 29.3 g of ammonium nitrate were added under stirring. The mixture was heated to 80° C. after which 29.3 g of the LEV-type zeolite obtained from Example 2A was added. The resulting mixture was then refluxed for 2 hours, after which the solid product was filtered off. The procedure was then repeated with a fresh solution of ammonium nitrate to which the solid product was added and again refluxed for 2 hours.

After again having filtered off the solid product, the solid residue was washed with 1.5 l of distilled water and subsequently dried at 120° C. for 6 hours. Finally, the solid product was calcinated at 350° C. for 5 hours using a heating ramp of 1° C. per minute for achieving said temperature. The procedure afforded 27.4 g of a light brown microcrystalline powder having a crystallinity grade of 80%, wherein the microcrystalline product displayed a mean diameter of the crystals of 68 nm.

Elemental Analysis:
Si: 30 g/100 g
Al: 8.0 g/100 g
Na: 1.1 g/100 g

Therefore, according to elemental analysis, the $SiO_2:Al_2O_3$:Na ratio of the product is approximately 7.13:1:0.32.

Figure 2B:
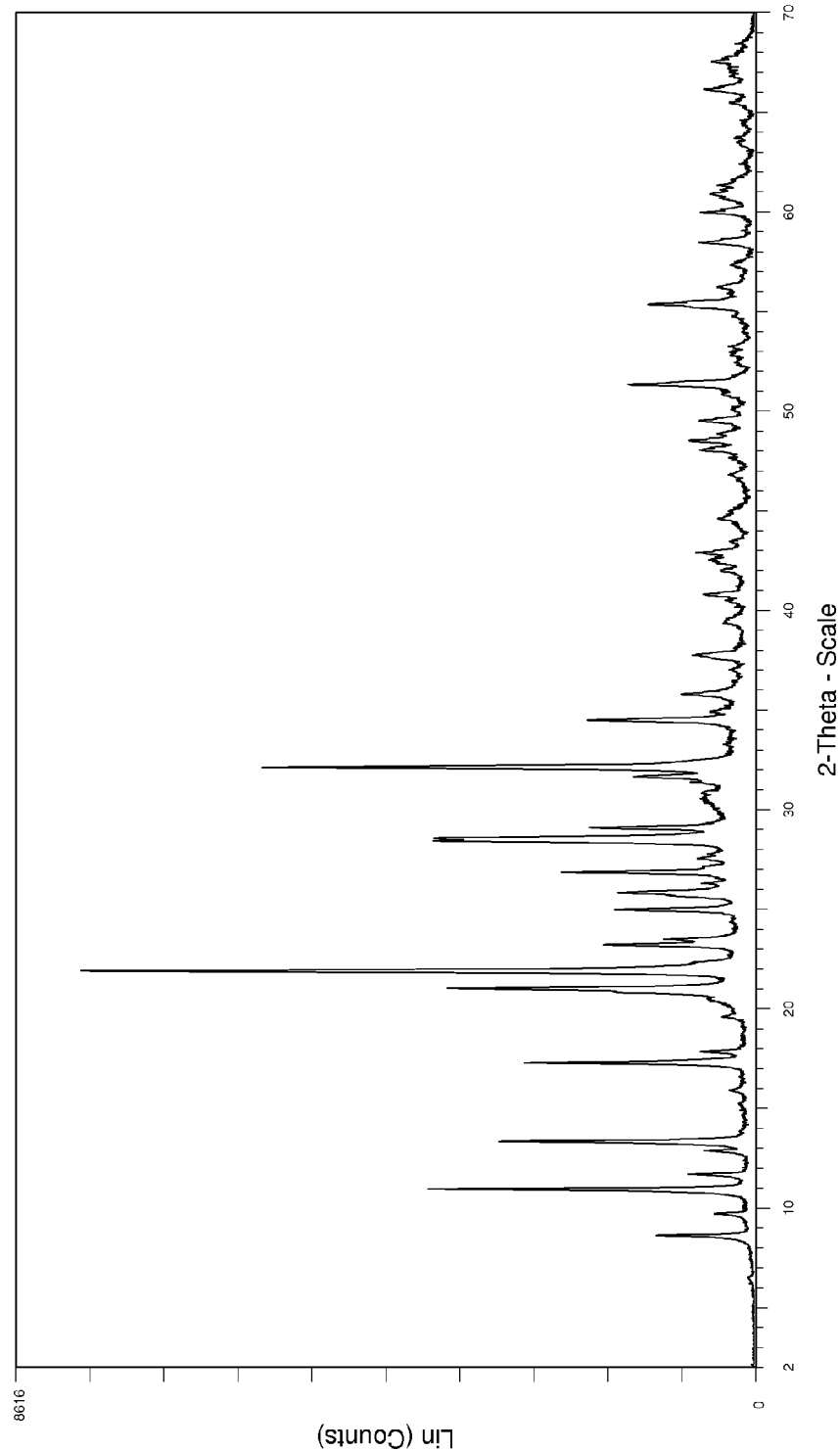

FIG. 2B shows the XRD of the crystalline product obtained from the organotemplate-free synthesis of Example 2B. In particular, the XRD reflection pattern of the microcrystalline product reveals an LEV-type zeolite framework structure

Example 3A

Seed-Directed Synthesis of an LEV-Type Zeolite 1392.8 g of distilled water were weighed into a plastic beaker, together with 57.5 g of NaOH and 9.1 g of $NaAlO_2$. The mixture was then stirred for 30 min to afford a clear solution. 132.7 g of fumed silica (Aerosil 200) were then added in portions while stirring. 101.3 g of ethanol were then added and the mixture was stirred for 5 hours affording an alumina silicate gel with a molar ratio of $40SiO_2:1Al_2O_3$: $28Na:1407H_2O:40EtOH$. 6.6 g of RUB-50 seed crystals (Si:Al≈10) were then added to the mixture which was stirred for an additional 5 min to afford a thick slurry as the reaction mixture.

The gel mixture was then transferred to an autoclave and crystallized at 120° C. for 120 hours 5 days). After having let the reaction mixture cool to room temperature, it was filtered over a glass frit and the solid residue washed with 4 l of distilled water. The solid product was then transferred to a porcelain receptacle and dried therein at 120° C. for 16 hours, thus affording 31.2 g of a white powder having a crystallinity grade of 96%, wherein the microcrystalline product displayed a mean diameter of the crystallites of 89 nm.

Figure 3A:
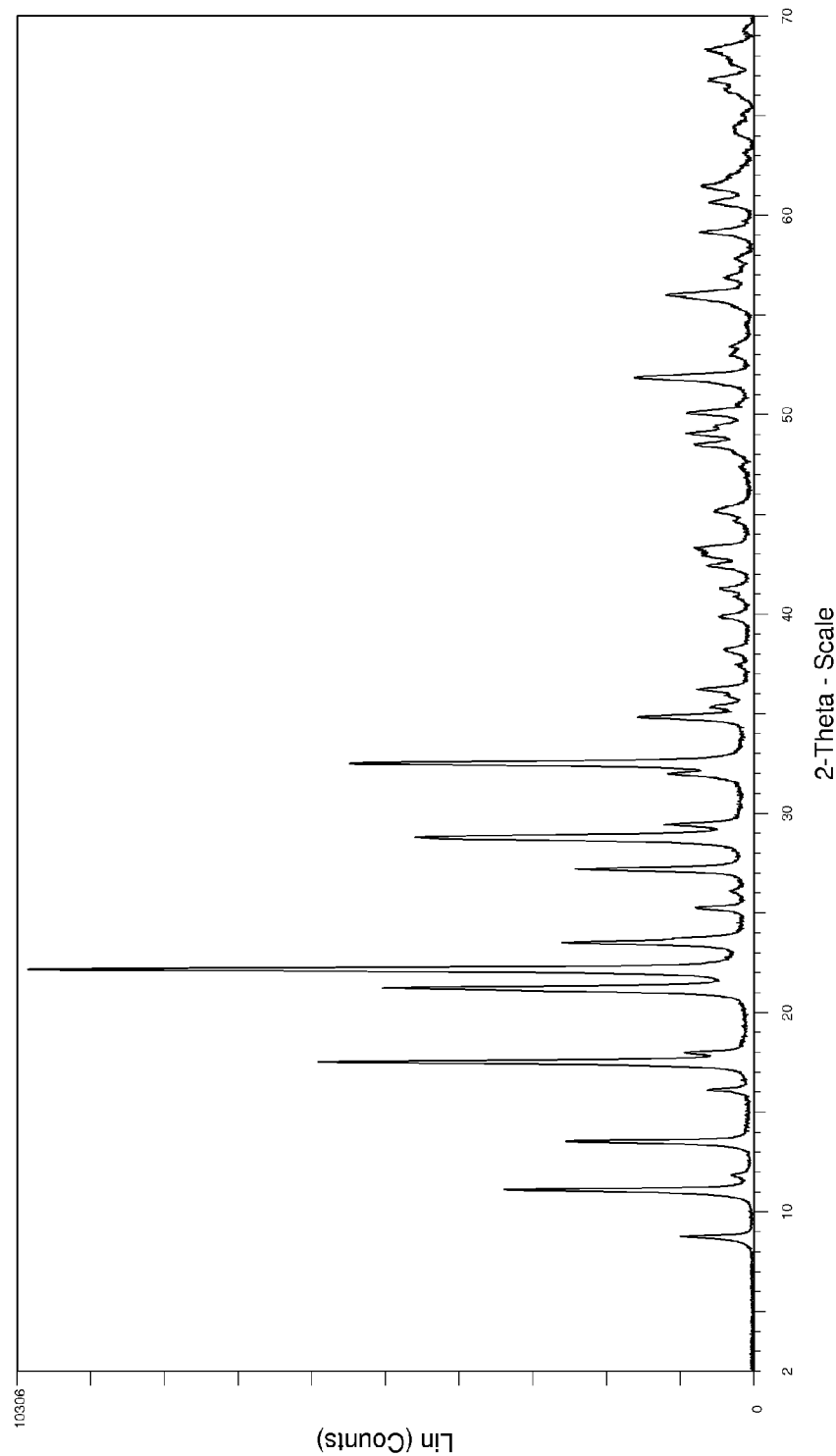

In FIG. 3A the XRD of the RUB-50 seed material is displayed, showing the typical pattern for the LEV-type zeolite framework structure.

Figure 3B:
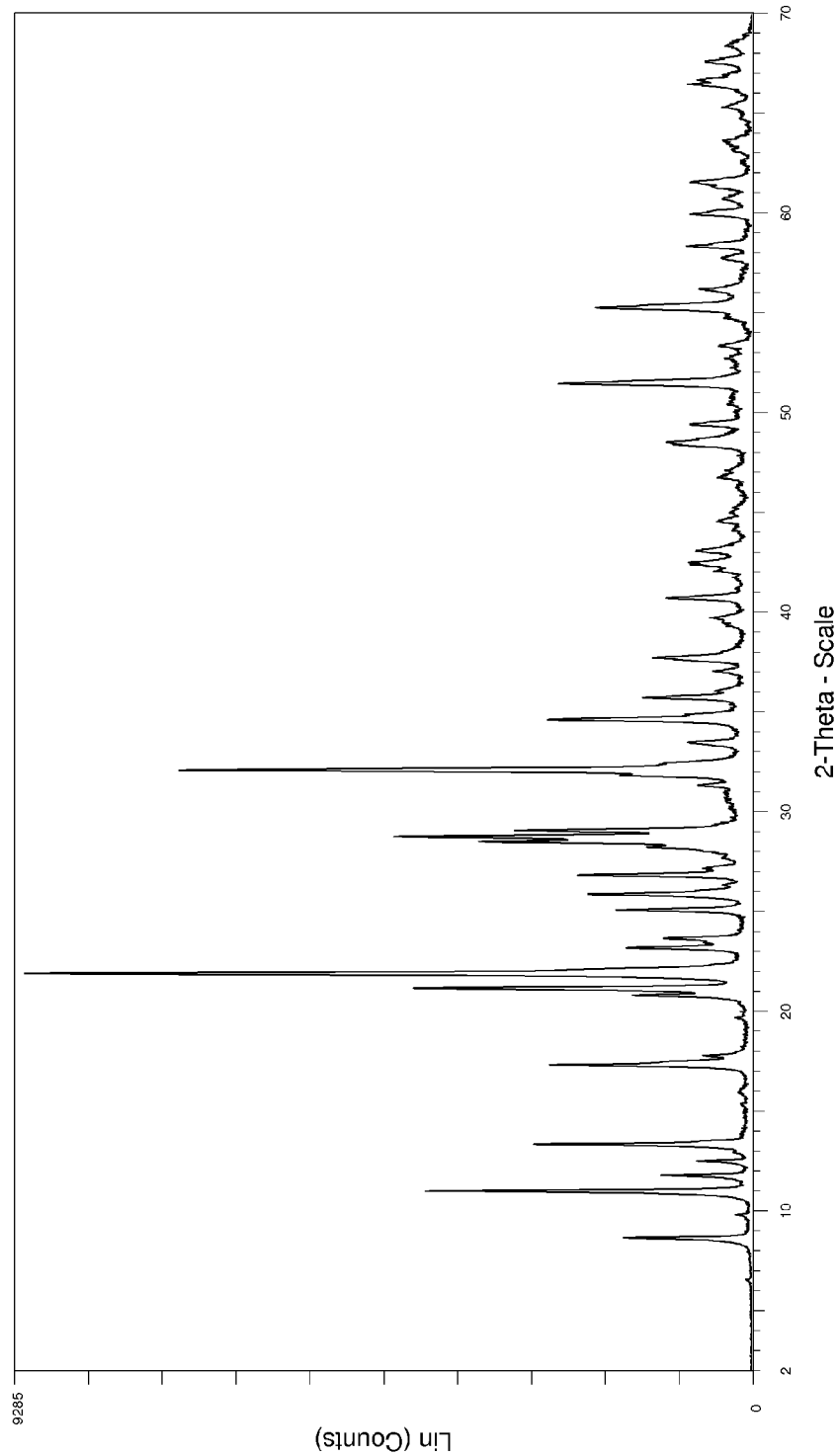

FIG. 3B shows the crystalline product obtained from the organotemplate-free synthesis of Example 3A. In particular, the XRD reflection pattern of the microcrystalline product reveals an LEV-type zeolite framework structure.

Example 3B

Ion-Exchange of the LEV-Type Zeolite of Example 3A 290 g of distilled water were weighed into a four-neck flask to which 29.0 g of ammonium nitrate were added under stirring. The mixture was heated to 80° C. after which 29.0 g of the LEV-type zeolite obtained from Example 3A was added. The resulting mixture was then refluxed for 2 hours, after which the solid product was filtered off. The procedure was then repeated with a fresh solution of ammonium nitrate to which the solid product was added and again refluxed for 2 hours.

After again having filtered off the solid product, the solid residue was washed with 1.5 l of distilled water and subsequently dried at 120° C. for 6 hours. Finally, the solid product was calcinated at 350° C. for 5 hours using a heating ramp of 1° C. per minute for achieving said temperature. The procedure afforded 25.7 g of a white powder having a crystallinity grade of 96%, wherein the microcrystalline product displayed a mean diameter of the crystals of 72 nm.

Figure 3C:
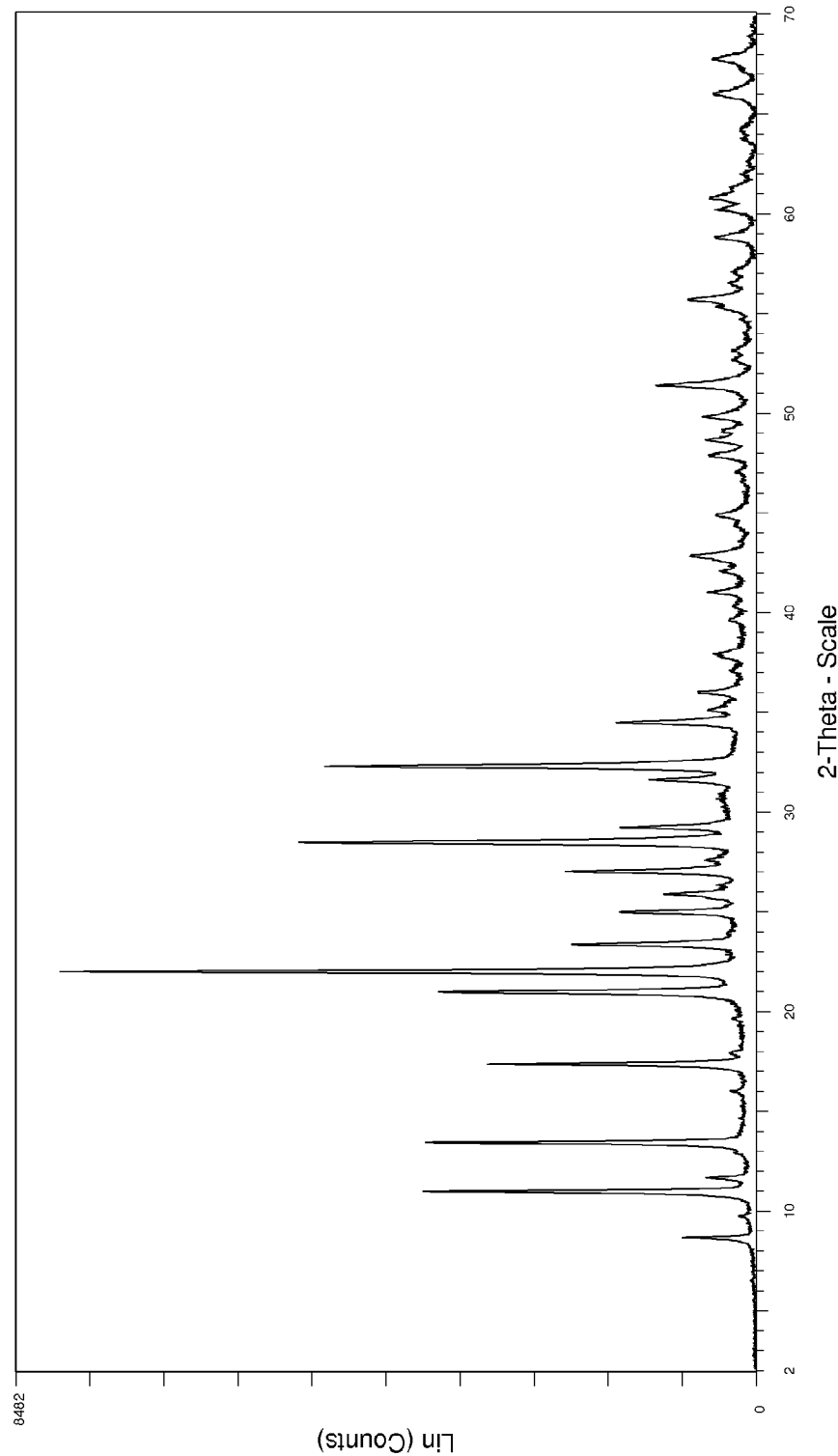
Figure 3D:
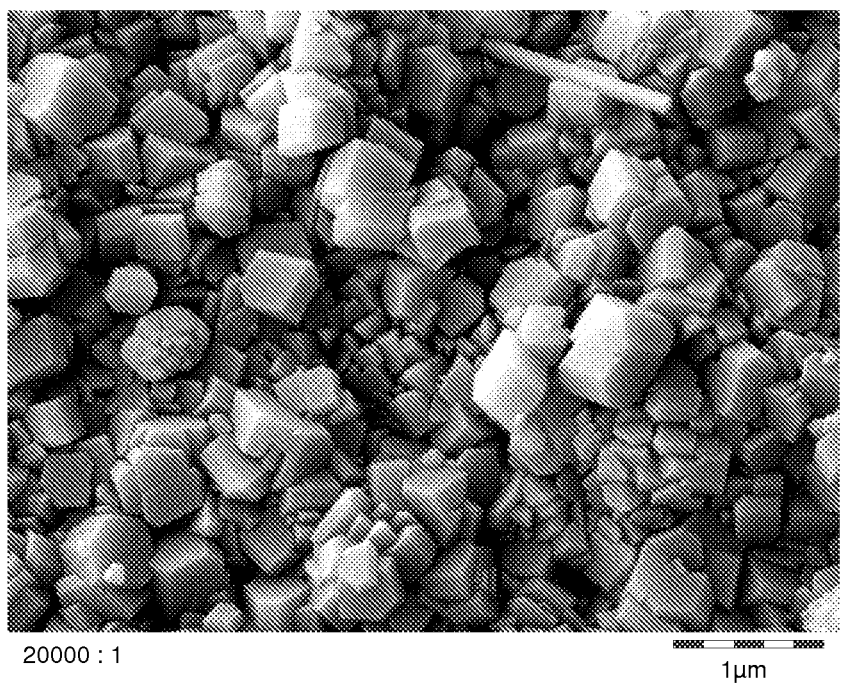
FIGS. 3D and 4C show the scanning electron microscope (SEM) images obtained from samples of the crystalline products obtained according to Examples 3B and 4B, respectively.

In FIG. 3C, the XRD of the crystalline product obtained according to Example 3B is displayed, wherein a reflection pattern typical for an LEV-type zeolite framework structure is apparent. FIG. 3D displays an SEM-image of the crystalline product of Example 3B.

The nitrogen isotherm obtained using the crystalline product of Example 3B afforded a step-like curve of a type I adsorption isotherm typical of microporous solids (cf. DIN 66135), indicating that the as-synthesized zeolitic material has open micropores. The evaluation of the data gave an equivalent surface of 524.55 $m^2/g$ according to the Langmuir method, and a BET surface area of 402.44 $m^2/g$.

A sample of the crystalline product from Example 3B was analyzed by Energy Dispersive X-Ray (EDX) Spectroscopy, according to which the $SiO_2:Al_2O_3:Na$ ratio in the sample is approximately 7.14:1:0.36.

Example 4A

Seed-Directed Synthesis of an LEV-Type Zeolite 1388.2 g of distilled water were weighed into a plastic beaker, together with 60.3 g of NaOH and 11.8 g of $NaAlO_2$. The mixture was then stirred for 30 min to afford a clear solution. 132.2 g of fumed silica (Aerosil 200) were then added in portions while stirring. 101.0 g of ethanol were then added and the mixture was stirred for 5 hours affording an alumina silicate gel with a molar ratio of $31SiO_2:1Al_2O_3$: $24Na:1102H_2O:31EtOH$. 6.6 g of RUB-50 seed crystals prepared according to Example 3A were then added to the mixture which was stirred for an additional 5 min to afford a thick slurry as the reaction mixture.

The gel mixture was then transferred to an autoclave and crystallized at 120° C. for 120 hours (5 days). After having let the reaction mixture cool to room temperature, it was filtered over a glass frit and the solid residue washed with 4 l of distilled water. The solid product was then transferred to a porcelain receptacle and dried therein at 120° C. for 16 hours, thus affording 36.5 g of a white powder having a crystallinity grade of 98%, wherein the microcrystalline product displayed a mean diameter of the crystallites of 65 nm.

Figure 4A:
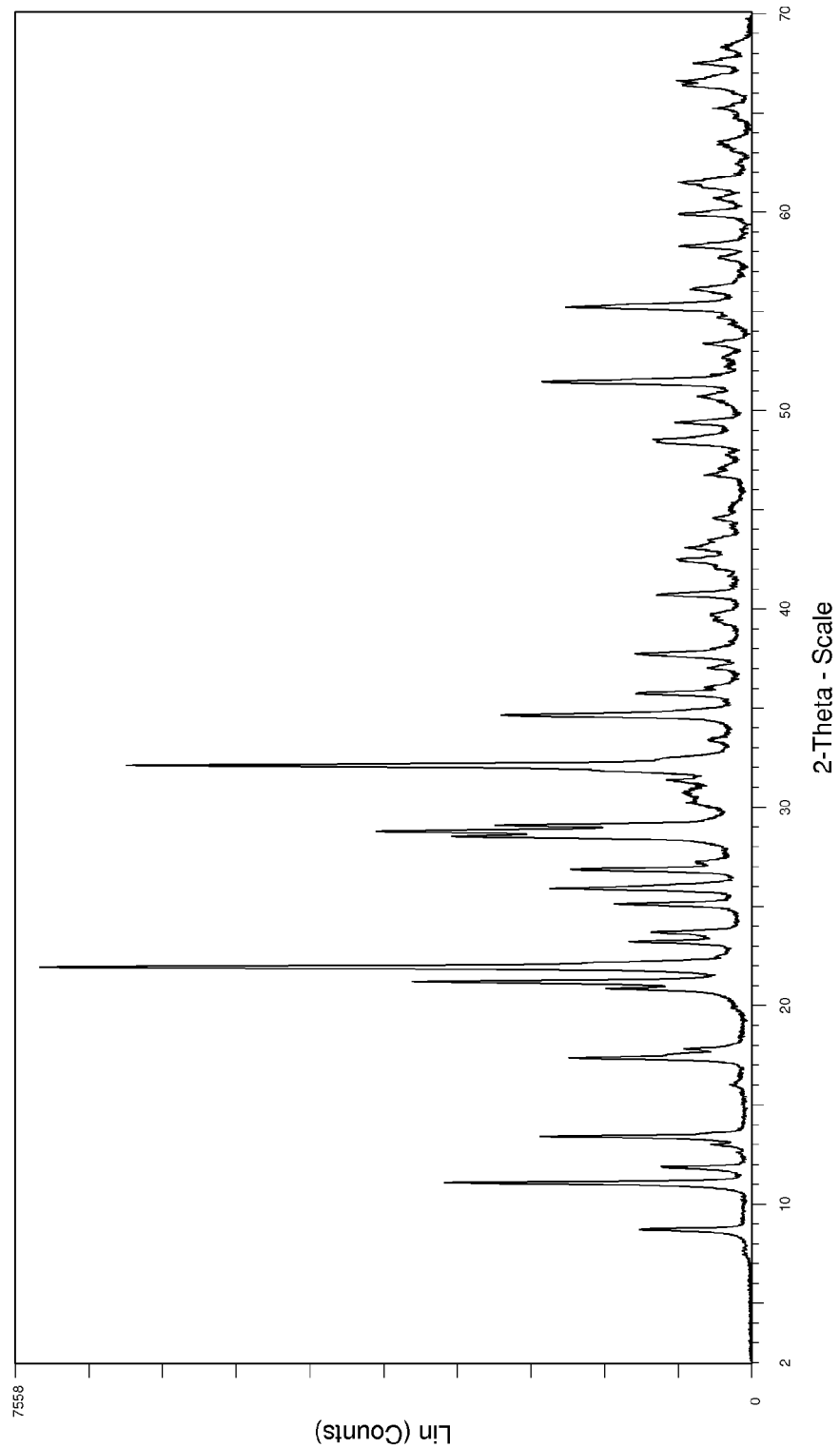

FIG. 4A shows the XRD of the crystalline product obtained from the organotemplate-free synthesis of Example 4A. In particular, the XRD reflection pattern of the microcrystalline product reveals an LEV-type zeolite framework structure.

Example 4B

Ion-Exchange of the LEV-Type Zeolite of Example 4A 300 g of distilled water were weighed into a four-neck flask to which 30.0 g of ammonium nitrate were added under stirring. The mixture was heated to 80° C. after which 30.0 g of the LEV-type zeolite obtained from Example 4A was added. The resulting mixture was then refluxed for 2 hours, after which the solid product was filtered off. The procedure was then repeated with a fresh solution of ammonium nitrate to which the solid product was added and again refluxed for 2 hours.

After again having filtered off the solid product, the solid residue was washed with 1.5 l of distilled water and subsequently dried at 120° C. for 6 hours. Finally, the solid product was calcinated at 350° C. for 5 hours using a heating ramp of 1° C. per minute for achieving said temperature. The procedure afforded 26.3 g of a white powder having a crystallinity grade of 91%, wherein the microcrystalline product displayed a mean diameter of the crystals of 67 nm.

Figure 4B:
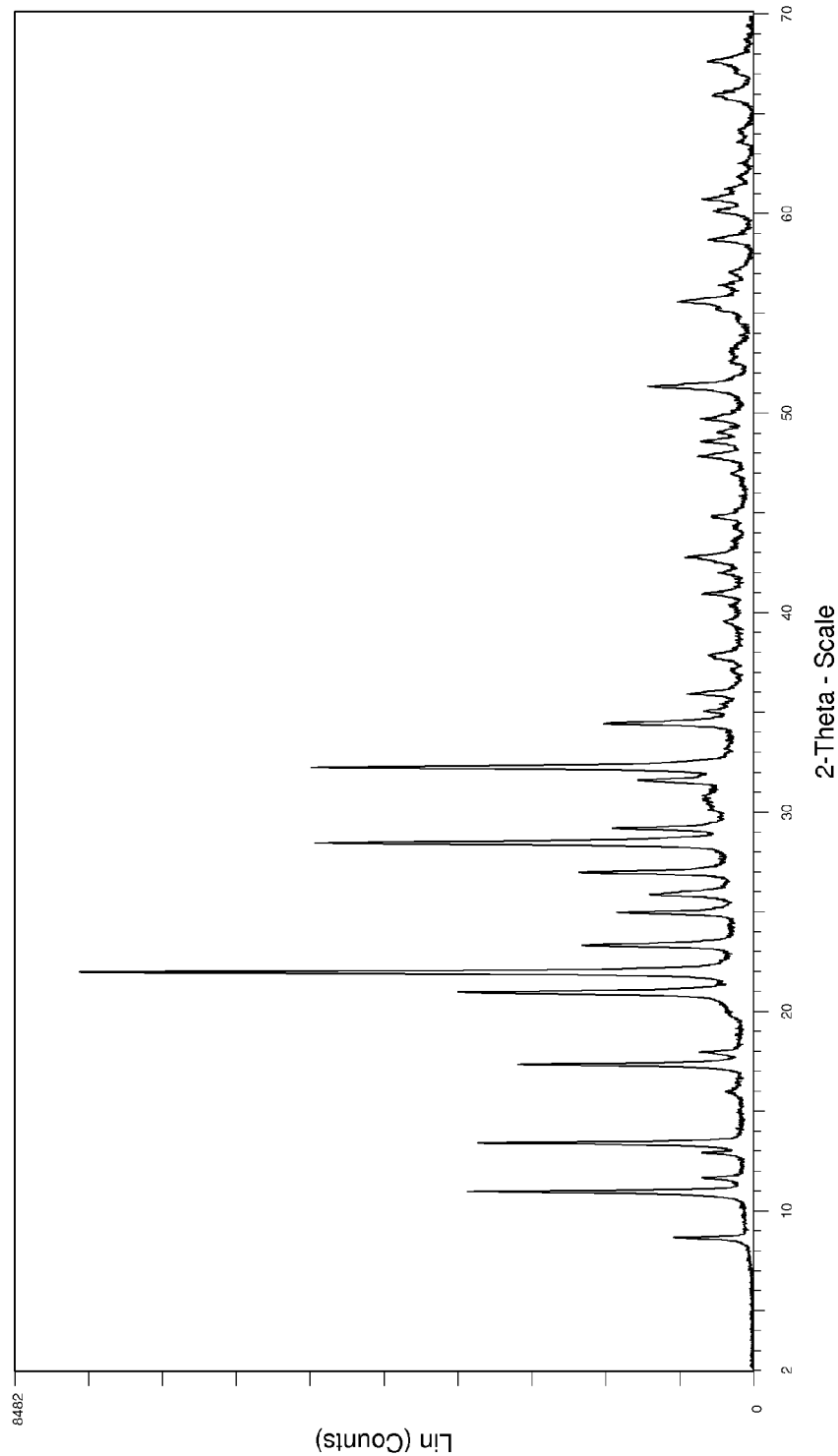
Figure 4C:
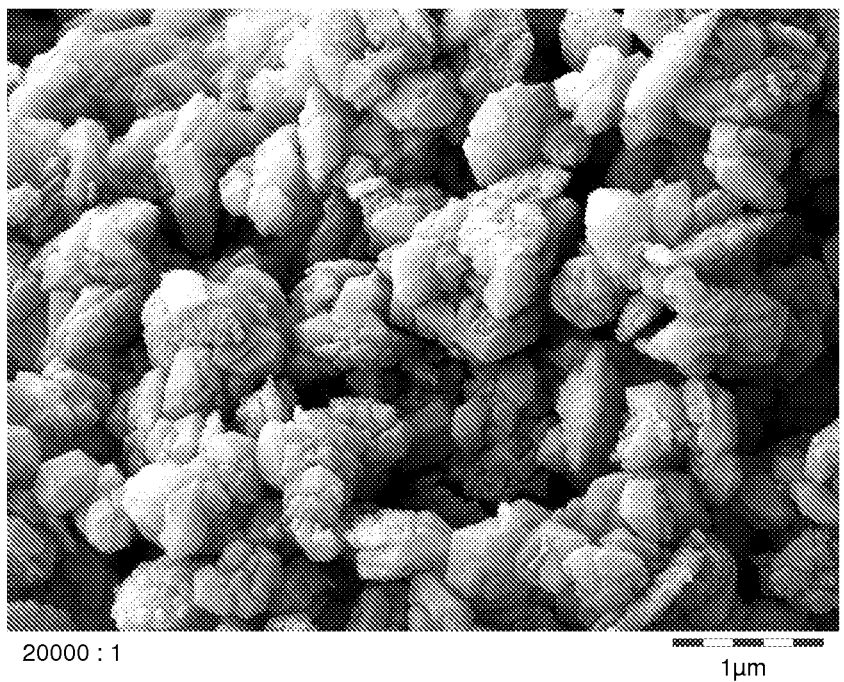

In FIG. 4B, the XRD of the crystalline product obtained according to Example 4B is displayed, wherein a reflection pattern typical for an LEV-type zeolite framework structure is apparent. FIG. 4C displays an SEM-image of the crystalline product of Example 4B.

The nitrogen isotherm obtained using the crystalline product of Example 4B afforded a step-like curve of a type I adsorption isotherm typical of microporous solids (cf. DIN 66135), indicating that the as-synthesized zeolitic material has open micropores. The evaluation of the data gave an equivalent surface of 669.12 $m^2/g$ according to the Langmuir method, and a BET surface area of 512.54 $m^2/g$.

A sample of the crystalline product from Example 4B was analyzed by Energy Dispersive X-Ray (EDX) Spectroscopy, according to which the $SiO_2:Al_2O_3:Na$ ratio in the sample is approximately 6.49:1:0.40.

Example 5A

Seed-Directed Synthesis of an LEV-Type Zeolite 1393.5 g of distilled water were weighed into a plastic beaker, together with 57.5 g of NaOH and 8.3 g of $NaAlO_2$. The mixture was then stirred for 30 min to afford a clear solution. 132.7 g of fumed silica (Aerosil 200) were then added in portions while stirring. 101.4 g of ethanol were then added and the mixture was stirred for 5 hours affording an alumina silicate gel with a molar ratio of $44SiO_2:1Al_2O_3:31Na:1548H_2O:44EtOH$. 6.6 g of RUB-50 seed crystals prepared according to Example 3A were then added to the mixture which was stirred for an additional 5 min to afford a thick slurry as the reaction mixture.

The gel mixture was then transferred to an autoclave and crystallized at 120° C. for 120 hours (5 days). After having let the reaction mixture cool to room temperature, it was filtered over a glass frit and the solid residue washed with 4 l of distilled water. The solid product was then transferred to a porcelain receptacle and dried therein at 120° C. for 16 hours, thus affording 27.5 g of a grayish powder having a crystallinity grade of 93%, wherein the microcrystalline product displayed a mean diameter of the crystallites of 73.5 nm.

Figure 5A:
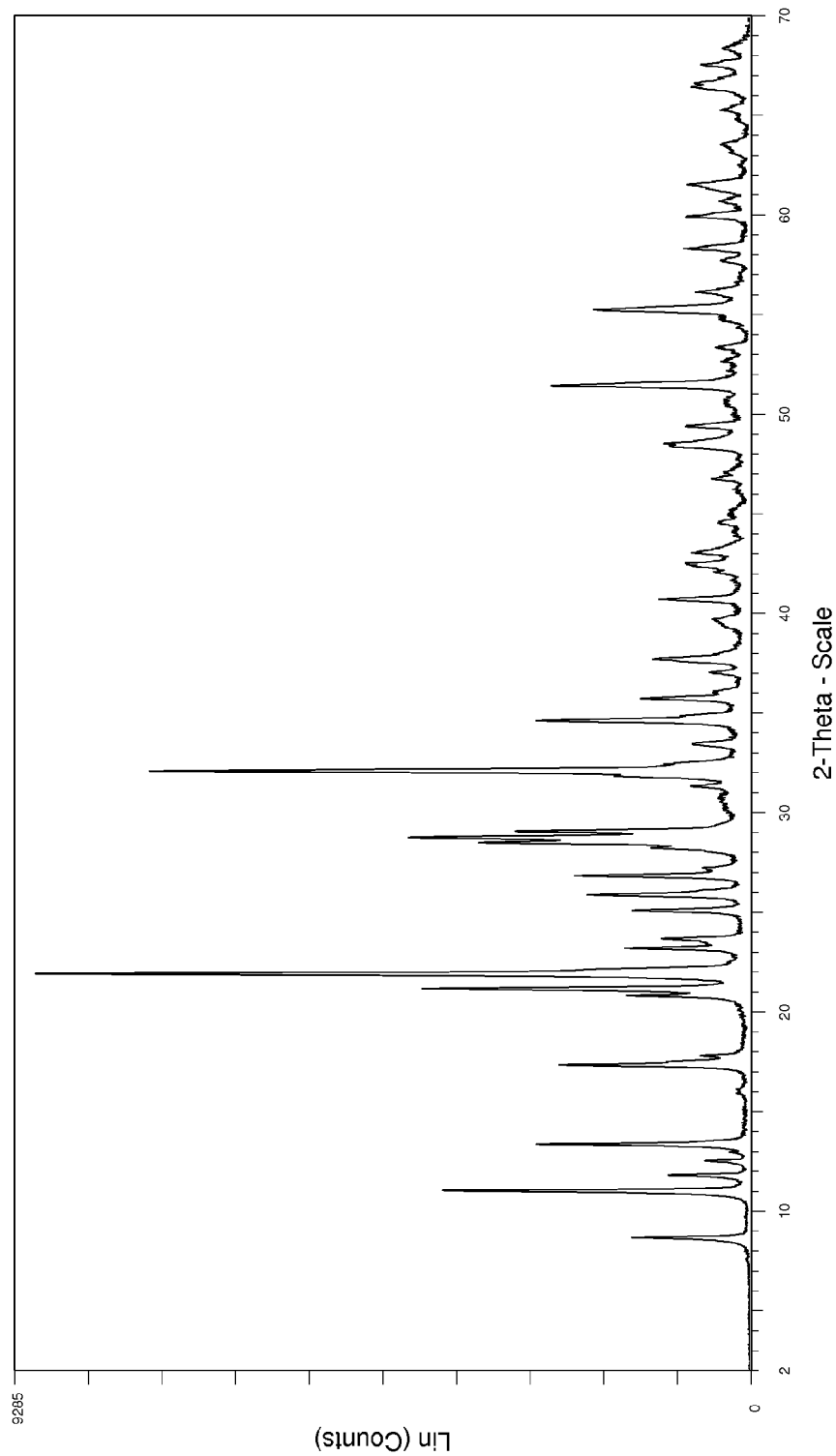

FIG. 5A shows the XRD of the crystalline product obtained from the organotemplate-free synthesis of Example 5A. In particular, the XRD reflection pattern of the microcrystalline product reveals an LEV-type zeolite framework structure.

Example 5B

Ion-Exchange of the LEV-Type Zeolite of Example 5A 250 g of distilled water were weighed into a four-neck flask to which 25.0 g of ammonium nitrate were added under stirring. The mixture was heated to 80° C. after which 25.0 g of the LEV-type zeolite obtained from Example 5A was added. The resulting mixture was then refluxed for 2 hours, after which the solid product was filtered off. The procedure was then repeated with a fresh solution of ammonium nitrate to which the solid product was added and again refluxed for 2 hours.

After again having filtered off the solid product, the solid residue was washed with 1.5 l of distilled water and subsequently dried at 120° C. for 6 hours. Finally, the solid product was calcinated at 350° C. for 5 hours using a heating ramp of 1° C. per minute for achieving said temperature. The procedure afforded 23.1 g of a white powder having a crystallinity grade of 77%, wherein the microcrystalline product displayed a mean diameter of the crystals of 58 nm.

Figure 5B:
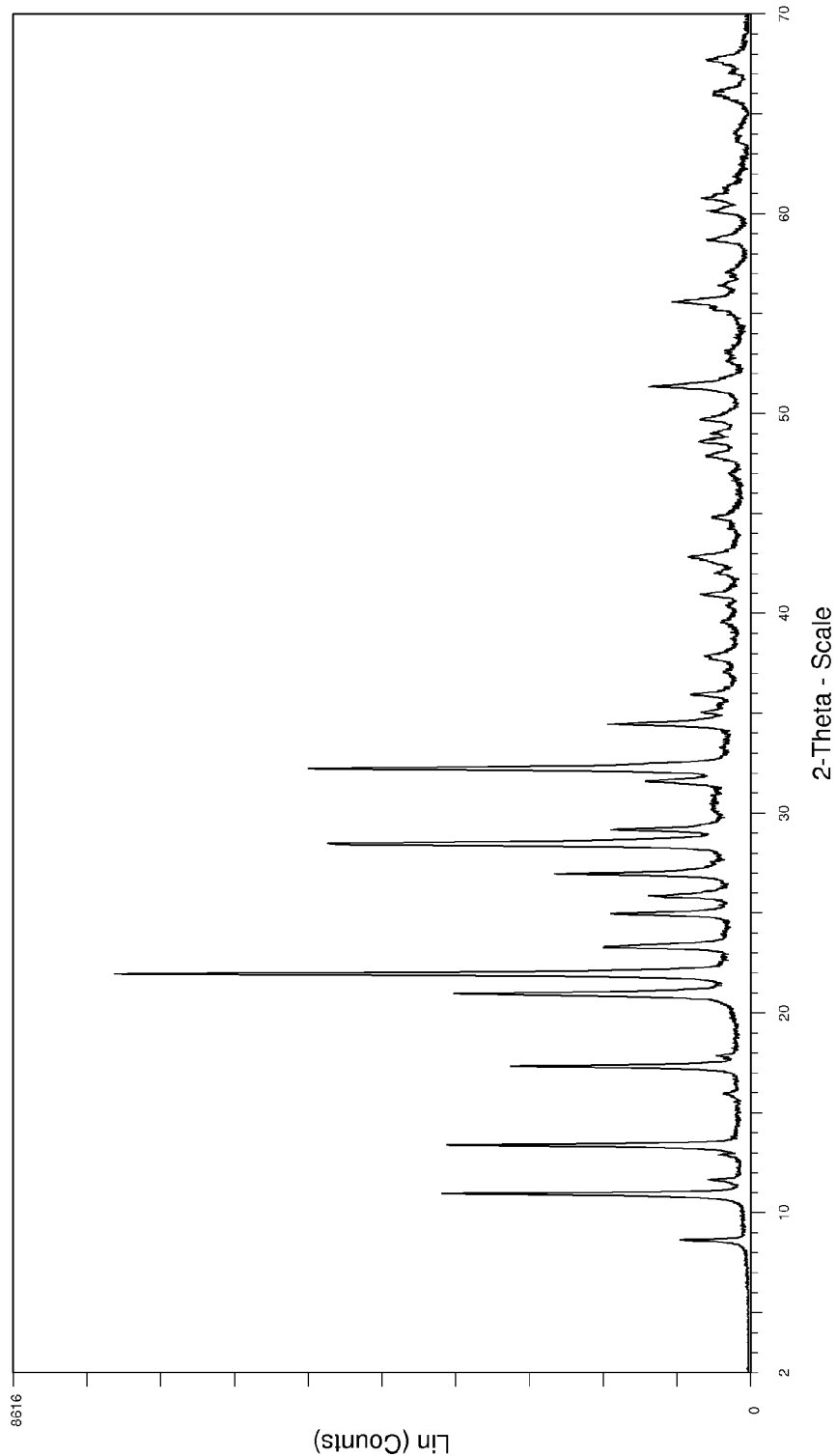

FIG. 5B shows the XRD of the crystalline product obtained from the organotemplate-free synthesis of Example 5B. In particular, the XRD reflection pattern of the microcrystalline product reveals an LEV-type zeolite framework structure The nitrogen isotherm obtained using the crystalline product of Example 5B afforded a step-like curve of a type I adsorption isotherm typical of microporous solids (cf. DIN 66135), indicating that the as-synthesized zeolitic material has open micropores. The evaluation of the data gave an equivalent surface of 448.73 $m^2/g$ according to the Langmuir method, and a BET surface area of 343.91 $m^2/g$.

Example 6A

Seed-Directed Synthesis of an LEV-Type Zeolite 1395.3 g of distilled water were weighed into a plastic beaker, together with 51.9 g of NaOH and 11.8 g of $NaAlO_2$. The mixture was then stirred for 30 min to afford a clear solution. 132.9 g of fumed silica (Aerosil 200) were then added in portions while stirring. 101.5 g of ethanol were then added and the mixture was stirred for 5 hours affording an alumina silicate gel with a molar ratio of $32SiO_2:1Al_2O_3:21Na:1107H_2O:31EtOH$. 6.6 g of RUB-50 seed crystals prepared according to Example 3A were then added to the mixture which was stirred for an additional 5 min to afford a thick slurry as the reaction mixture.

The gel mixture was then transferred to an autoclave and crystallized at 120° C. for 120 hours (5 days). After having let the reaction mixture cool to room temperature, it was filtered over a glass frit and the solid residue washed with 4 l of distilled water. The solid product was then transferred to a porcelain receptacle and dried therein at 120° C. for 16 hours, thus affording 42.0 g of a white powder having a crystallinity grade of 96%, wherein the microcrystalline product displayed a mean diameter of the crystallites of 89.5 nm.

Figure 6A:
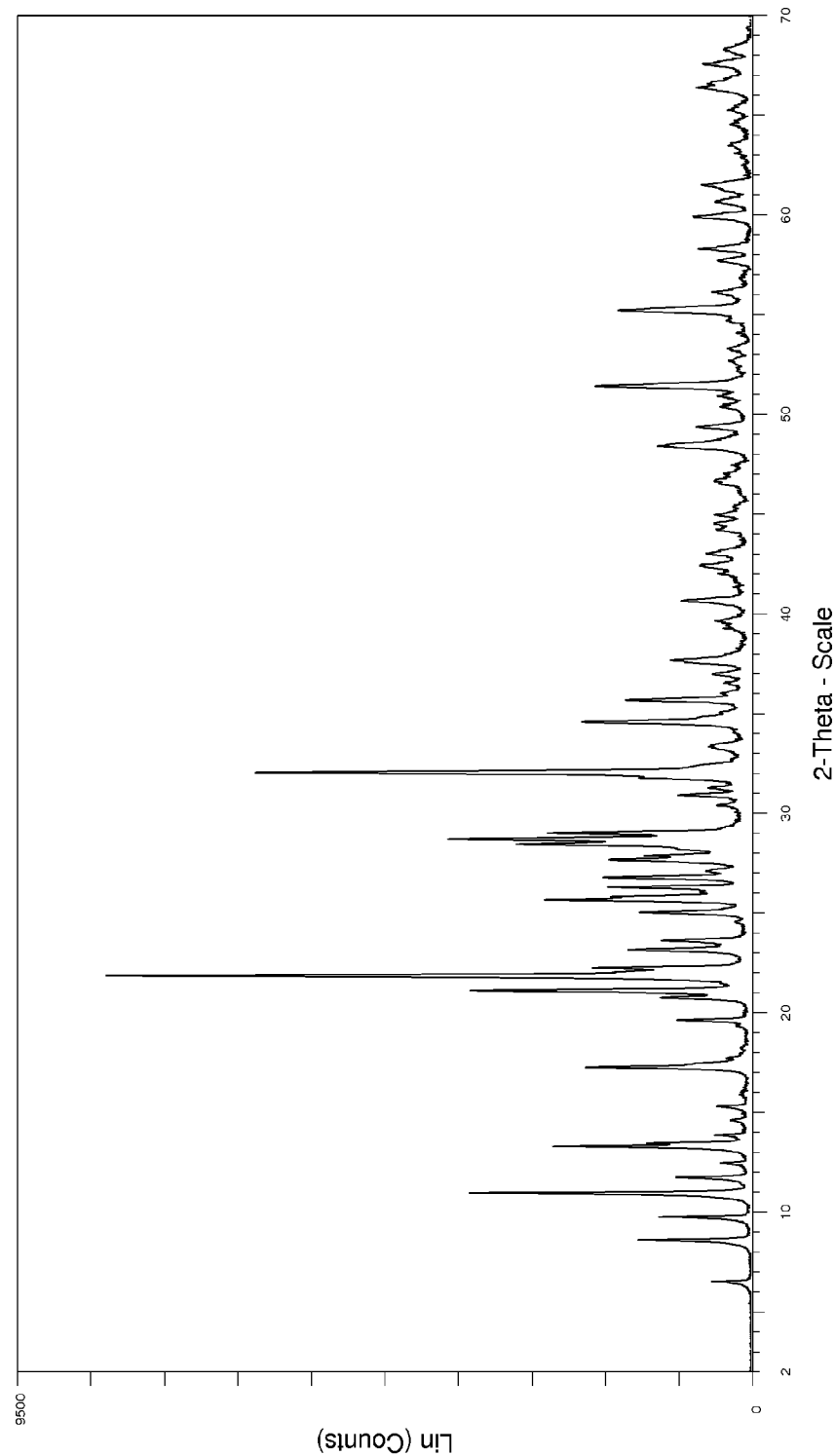

FIG. 6A shows the XRD of the crystalline product obtained from the organotemplate-free synthesis of Example 6A. In particular, the XRD reflection pattern of the microcrystalline product reveals an LEV-type zeolite framework structure.

Example 6B

Ion-Exchange of the LEV-Type Zeolite of Example 6A 400 g of distilled water were weighed into a four-neck flask to which 40.0 g of ammonium nitrate were added under stirring. The mixture was heated to 80° C. after which 40.0 g of the LEV-type zeolite obtained from Example 6A was added. The resulting mixture was then refluxed for 2 hours, after which the solid product was filtered off. The procedure was then repeated with a fresh solution of ammonium nitrate to which the solid product was added and again refluxed for 2 hours.

After again having filtered off the solid product, the solid residue was washed with 1.5 l of distilled water and subsequently dried at 120° C. for 6 hours. Finally, the solid product was calcinated at 450° C. for 5 hours using a heating ramp of 1° C. per minute for achieving said temperature. The procedure afforded 32.9 g of a light-brown powder having a crystallinity grade of 86%, wherein the microcrystalline product displayed a mean diameter of the crystals of 67 nm.

Figure 6B:
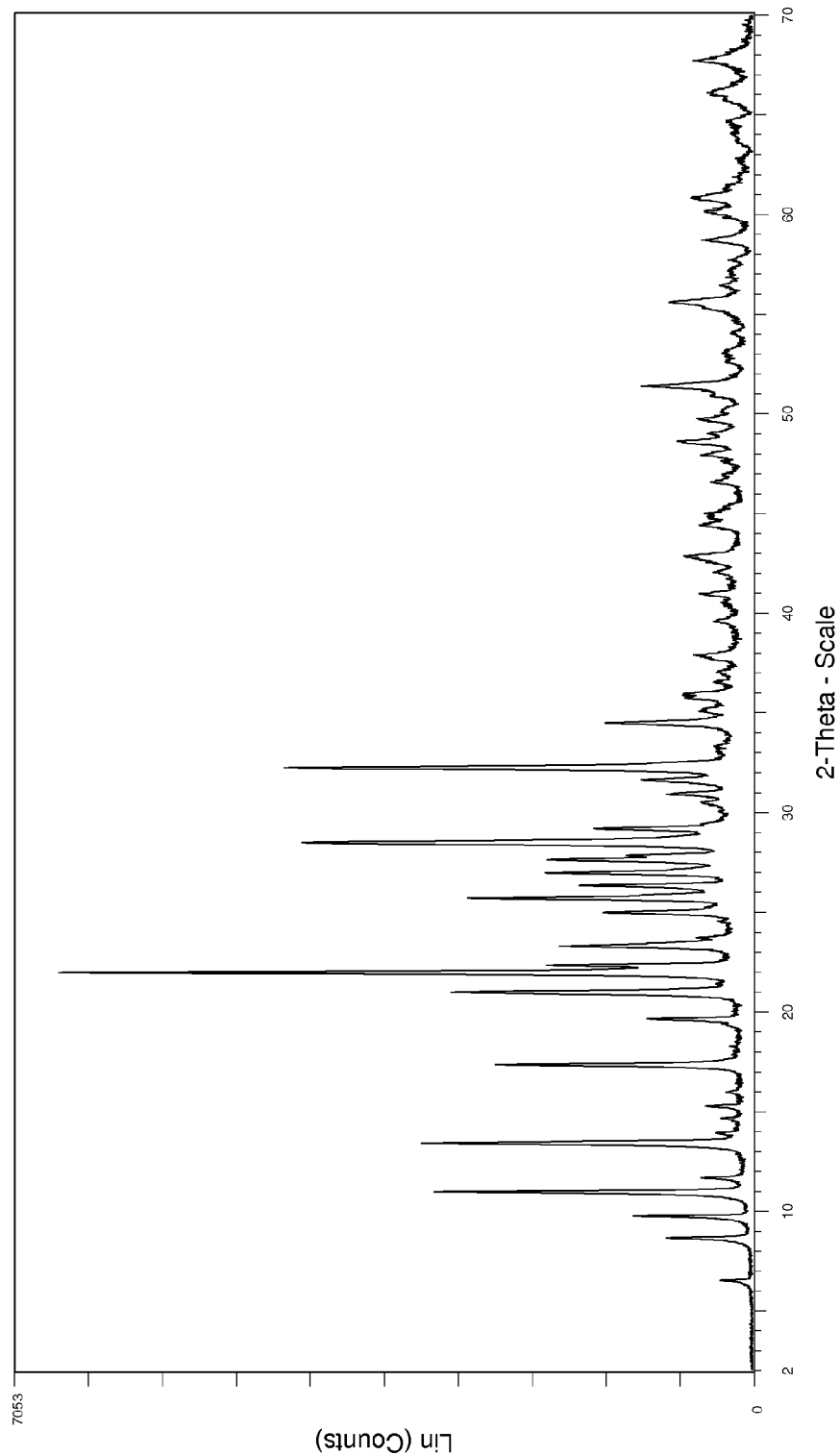

FIG. 6B shows the XRD of the crystalline product obtained from the organotemplate-free synthesis of Example 6B. In particular, the XRD reflection pattern of the microcrystalline product reveals an LEV-type zeolite framework structure The nitrogen isotherm obtained using the crystalline product of Example 6B afforded a step-like curve of a type I adsorption isotherm typical of microporous solids (cf. DIN 66135), indicating that the as-synthesized zeolitic material has open micropores. The evaluation of the data gave an equivalent surface of 635.78 m²/g according to the Langmuir method, and a BET surface area of 487.42 m²/g.

Example 7A

Seed-Directed Synthesis of an LEV-Type Zeolite 1392.9 g of distilled water were weighed into a plastic beaker, together with 54.7 g of NaOH and 11.8 g of NaAlO$_2$. The mixture was then stirred for 30 min to afford a clear solution. 132.7 g of fumed silica (Aerosil 200) were then added in portions while stirring. 101.3 g of ethanol were then added and the mixture was stirred for 5 hours affording an alumina silicate gel with a molar ratio of 31SiO$_2$:1Al$_2$O$_3$: 22Na:1105H$_2$O:31EtOH. 6.6 g of RUB-50 seed crystals prepared according to Example 3A were then added to the mixture which was stirred for an additional 5 min to afford a thick slurry as the reaction mixture.

The gel mixture was then transferred to an autoclave and crystallized at 120° C. for 120 hours (5 days). After having let the reaction mixture cool to room temperature, it was filtered over a glass frit and the solid residue washed with 4 l of distilled water. The solid product was then transferred to a porcelain receptacle and dried therein at 120° C. for 16 hours, thus affording 36.9 g of a white powder having a crystallinity grade of 95%, wherein the microcrystalline product displayed a mean diameter of the crystallites of 75 nm.

Figure 7A:
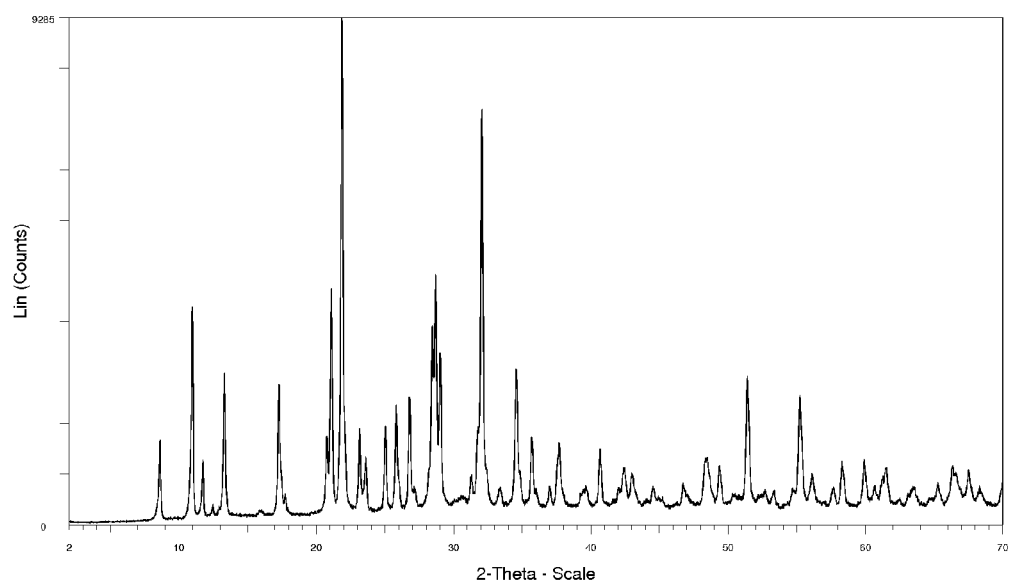

FIG. 7A shows the XRD of the crystalline product obtained from the organotemplate-free synthesis of Example 7A. In particular, the XRD reflection pattern of the microcrystalline product reveals an LEV-type zeolite framework structure.

Example 7B

Ion-Exchange of the LEV-Type Zeolite of Example 7A 330 g of distilled water were weighed into a four-neck flask to which 33.0 g of ammonium nitrate were added under stirring. The mixture was heated to 80° C. after which 33.0 g of the LEV-type zeolite obtained from Example 7A was added. The resulting mixture was then refluxed for 2 hours, after which the solid product was filtered off. The procedure was then repeated with a fresh solution of ammonium nitrate to which the solid product was added and again refluxed for 2 hours.

After again having filtered off the solid product, the solid residue was washed with 1.5 l of distilled water and subsequently dried at 120° C. for 6 hours. Finally, the solid product was calcinated at 350° C. for 5 hours using a heating ramp of 1° C. per minute for achieving said temperature. The procedure afforded 28.6 g of a light-brown powder having a crystallinity grade of 77%, wherein the microcrystalline product displayed a mean diameter of the crystals of 63 nm.

Figure 7B:
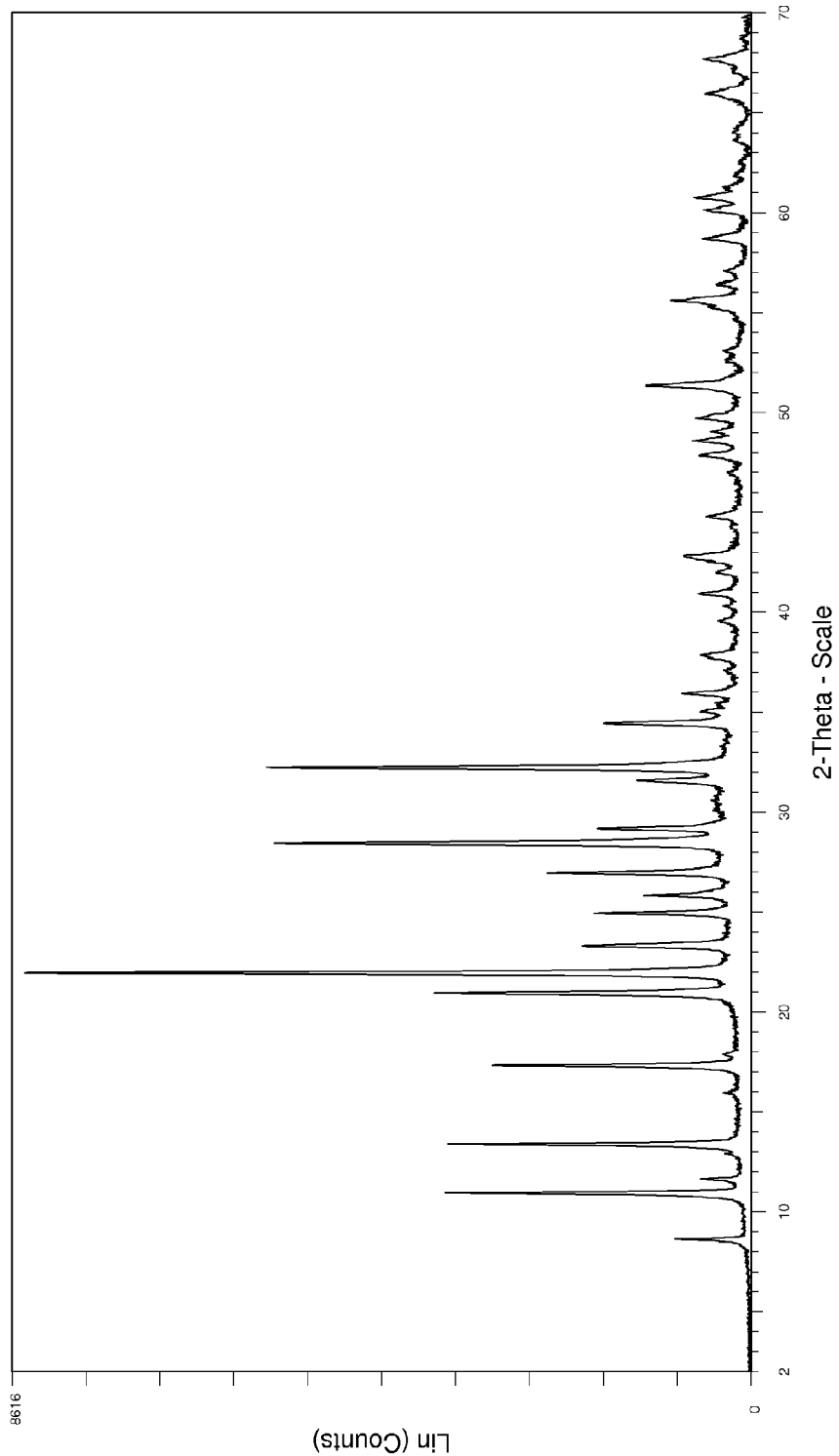

FIG. 7B shows the XRD of the crystalline product obtained from the organotemplate-free synthesis of Example 7B. In particular, the XRD reflection pattern of the microcrystalline product reveals an LEV-type zeolite framework structure The nitrogen isotherm obtained using the crystalline product of Example 7B afforded a step-like curve of a type I adsorption isotherm typical of microporous solids (cf. DIN 66135), indicating that the as-synthesized zeolitic material has open micropores. The evaluation of the data gave an equivalent surface of 668.27 m²/g according to the Langmuir method, and a BET surface area of 513.30 m²/g.

Example 8

Preparation of the RUB-50 Seed Crystals 2.2 g of sodium hydroxide were dissolved in 152 g of water, after which 1,956.2 g of 20 wt.% diethyldimethylammoniumhydroxide solution were added. 20.1 g of sodium aluminate and 15 g of chabazite seed crystals were then successively added to the solution, after which 369.5 g of fumed silica (Aerosil 200) were added in portions under stirring. The resulting mixture was stirred for 1 h, and then let stand for 1 d, after which it was transferred to an autoclave and heated therein at 130° C. for 20 d.

The resulting white suspension was centrifuged and washed with distilled water until pH neutral. The reaction product was finally dried at 120° C. for 16 h thus affording 218.4 g of a white powder with a crystallinity grade of 92%, wherein the microcrystalline product displayed a mean diameter of the crystallites of 88 nm.

Figure 8A:
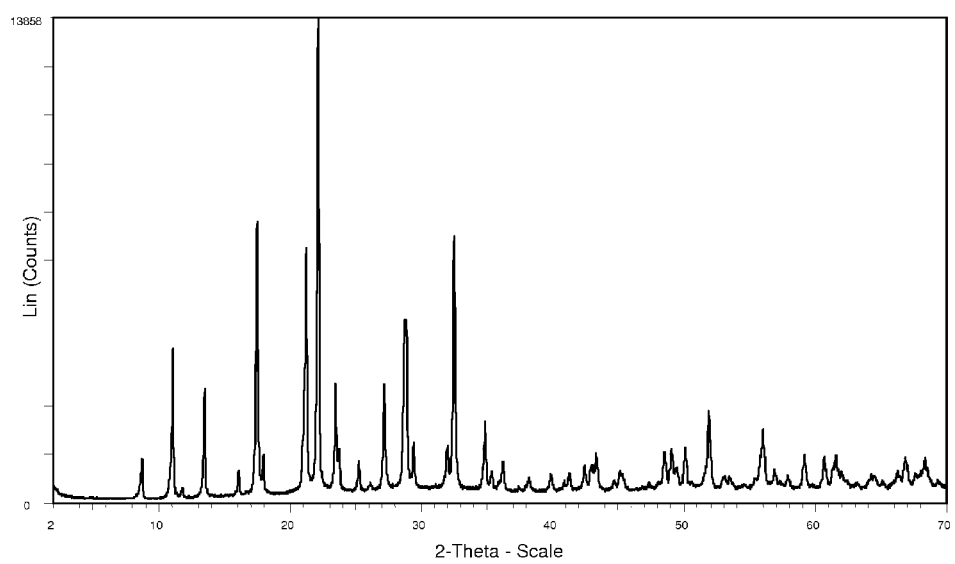

In FIG. 8A, the XRD of the RUB-50 material is displayed, having the LEV-type framework structure.

150 g of the RUB-50 material was then calcined at 550° C. for 4 h to afford 141.3 g of a light-yellow powder with a crystallinity grade of 64%.

Elemental Analysis:
Si: 35 g/100 g
Al: 2.5 g/100 g
Na: 0.45 g/100 g
C: <0.5 g/100 g Therefore, according to our elemental analysis, the SiO$_2$:Al$_2$O$_3$:Na ratio of the product is approximately 27:1:0.42.

Figure 8B:
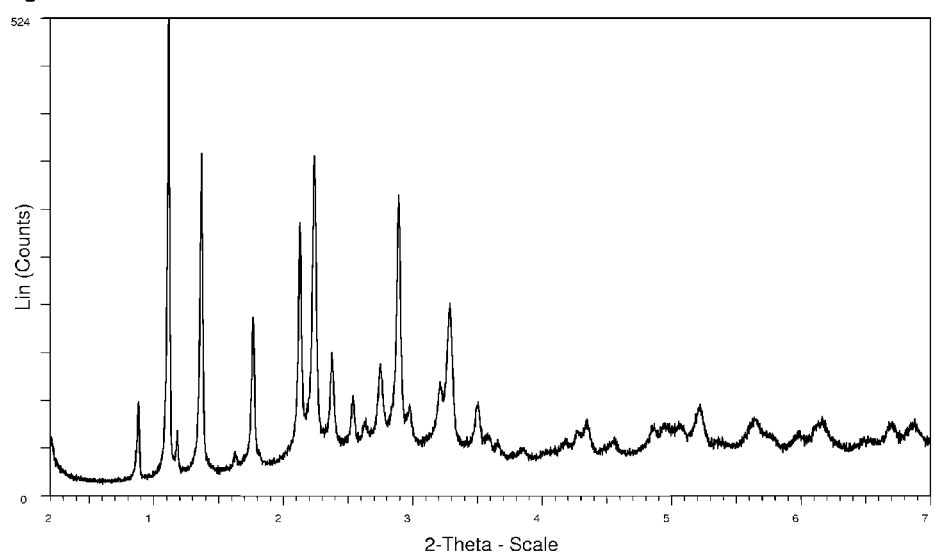

In FIG. 8B, the XRD of the calcined product is displayed, having the LEV-type framework structure.

Seed-Directed Synthesis of an LEV-Type Zeolite 1340.6 g of distilled water were weighed into a plastic beaker, together with 57.4 g of NaOH and 11.8 g of NaAlO$_2$. The mixture was then stirred for 30 min to afford a clear solution. 132.4 g of fumed silica (Aerosil 200) were then added in portions while stirring to afford a highly viscous mixture. Part of the mixture is vacuum-transferred to an autoclave, wherein a mixture of 101.2 g of ethanol, 50 g distilled water, and 6.6 g of the RUB-50 seed material was simultaneously sucked in as well, after which the remaining mixture was sucked into the autoclave.

The resulting mixture was then crystallized at 120° C. for 120 hours (5 days). After having let the reaction mixture cool to room temperature, it was filtered over a glass frit and the solid residue washed with 2.5 l of distilled water. The solid product was then transferred to a porcelain receptacle and dried therein at 120° C. for 16 hours, thus affording 38.3 g of a light-brown powder.

Figure 8C:
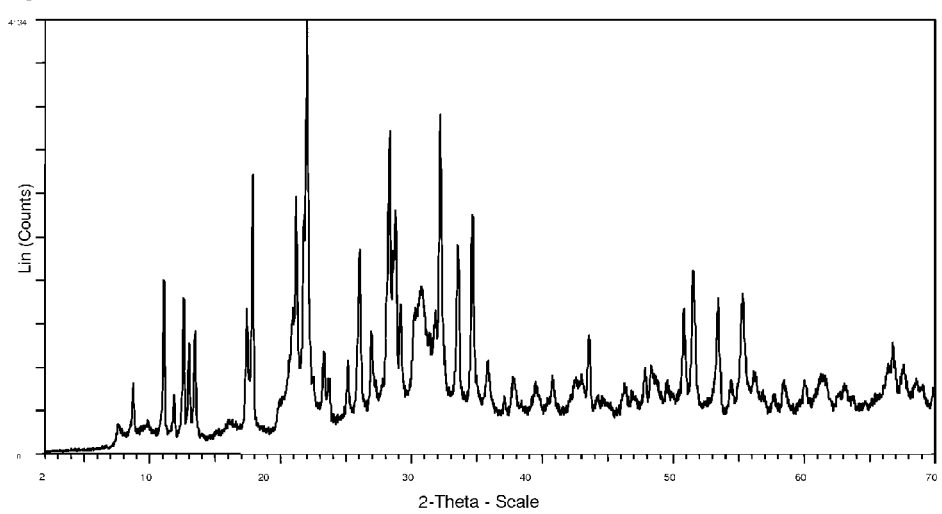

FIG. 8C shows the XRD of the crystalline product obtained from the organotemplate-free synthesis of Example 8. In particular, the XRD reflection pattern of the material reveals that it comprises a product having an LEV-type zeolite framework structure.

We claim:

1. An organotemplate-free synthetic process for the production of a zeolitic material having an LEV-type framework structure comprising YO$_2$ and optionally comprising X$_2$O$_3$, wherein said process comprises the steps of (1) preparing a mixture comprising seed crystals and one or more sources for YO$_2$; and (2) crystallizing the mixture obtained in step (1);

wherein Y is Si, and X is a trivalent element, wherein the zeolitic material optionally comprises one or more alkali metals M, and wherein the seed crystals comprise zeolitic material having an LEV-type framework structure.

2. The process of claim 1, wherein the mixture in step (1) further comprises one or more sources for $X_2O_3$.

3. The process of claim 2, wherein X is selected from the group consisting of Al, B, In, Ga, and mixtures of two or more thereof.

4. The process of claim 2, wherein the one or more sources for $X_2O_3$ comprises at least one aluminate salt.

5. The process of claim 4, wherein the one or more sources for $X_2O_3$ comprises sodium and/or potassium aluminate.

6. The process of claim 2, wherein the $YO_2:X_2O_3$ molar ratio of the mixture according to step (1) ranges from 0.5 to 300.

7. The process of claim 1, wherein the seed crystals comprise one or more zeolites selected from the group consisting of Levyne, LZ-132, NU-3, RUB-1, ZK-20, ZSM-45, RUB-50, and mixtures of two or more thereof.

8. The process of claim 1, wherein the one or more sources for $YO_2$ comprises silica.

9. The process of claim 1, wherein the amount of seed crystals in the mixture according to step (1) ranges from 0.01 to 30 wt.-% based on 100 wt.-% of $YO_2$ in the at least one source for $YO_2$.

10. The process of claim 1, wherein the mixture according to step (1) further comprises one or more solvents.

11. The process of claim 10, wherein the mixture according to step (1) has a $H_2O:YO_2$ molar ratio in the range from 5 to 200.

12. The process of claim 1, wherein the mixture according to step (1) further comprises one or more sources for $OH^-$.

13. The process of claim 12, wherein the $OH^-:YO_2$ molar ratio of the mixture according to step (1) ranges from 0.01 to 5.

14. The process of claim 1, wherein the mixture according to step (1) further comprises one or more sources of one or more elements suitable for isomorphous substitution of at least a portion of the Y atoms and/or of the X atoms in the LEV-type framework structure.

15. The process of claim 14, wherein the molar ratio of $YO_2$ to the one or more elements suitable for isomorphous substitution of at least a portion of the Y atoms and/or of the X atoms in the LEV-type framework structure ranges from 3 to 300.

16. The process of claim 1, wherein the $M:YO_2$ molar ratio in the mixture according to step (1) ranges from 0.01 to 5.

17. The process of claim 1, wherein the $YO_2:X_2O_3:M$ molar ratios in the mixture according to step (1) range from (5-65):1:(1-55).

18. The process of claim 1, wherein the crystallization in step (2) involves heating of the mixture.

19. The process of claim 18, wherein the crystallization in step (2) is conducted under solvothermal conditions.

20. The process of claim 18, wherein the crystallization in step (2) involves heating of the mixture for a period ranging from 5 to 200 h.

21. The process of claim 1, wherein the crystallization in step (2) involves agitating the mixture.

22. The process of claim 1 further comprising one or more of the following steps of
(3) isolating the zeolitic material having an LEV-type framework structure, and/or
(4) washing the zeolitic material having an LEV-type framework structure, and/or
(5) drying the zeolitic material having an LEV-type framework structure, and/or
(6) subjecting the zeolitic material having an LEV-type framework structure to an ion-exchange procedure,
wherein the steps (3) and/or (4) and/or (5) and/or (6) can be conducted in any order.

23. The process of claim 22, wherein in the at least one step (6) at least one ionic non-framework element contained in the zeolitic material having an LEV-type framework is ion-exchanged.

24. The process of claim 1, wherein the zeolitic material having an LEV-type framework structure formed in step (2) comprises one or more zeolites selected from the group consisting of Levyne, LZ-132, NU-3, RU B-1, ZK-20, ZSM-45, RUB-50, and mixtures of two or more thereof.

25. The process of claim 1, wherein the seed crystals comprise a zeolitic material having an LEV-type framework structure as synthesized according to the process of claim 1.

26. The process of claim 1, wherein the organotemplate-free synthesis does not comprise a calcination step.

27. A synthetic organotemplate-free zeolitic material having an LEV-type framework structure obtainable and/or obtained according to the method of claim 1.

28. A synthetic organotemplate-free zeolitic material having an LEV-type framework structure comprising $YO_2$ and optionally comprising $X_2O_3$,
wherein Y is Si, and X is a trivalent element,
wherein the zeolitic material optionally comprises one or more alkali metals M, wherein said zeolitic material is non-calcined.

29. The organotemplate-free zeolitic material of claim 28, said material having an X-ray diffraction pattern comprising at least the following reflections:

| Intensity (%) | Diffraction angle 2θ/° [Cu K(alpha 1)] |
|---|---|
| [37-53] | [10.85-11.05] |
| [23-50] | [13.20-13.45] |
| [40-50] | [20.85-21.25] |
| 100 | [21.75-22.05] |
| [39-69] | [28.35-28.90] |
| [55-94] | [31.90-32.35] |
| [11-34] | [51.30-51.60] |
| [6-30] | [55.00-55.80] | wherein 100% relates to the intensity of the maximum peak in the X-ray powder diffraction pattern.

30. The organotemplate-free zeolitic material of claim 28, wherein the $YO_2:X_2O_3$ molar ratio ranges from 2 to 100.

31. The organotemplate-free zeolitic material of claim 28, wherein the molar ratio of alkali metal $M:X_2O_3$ ranges from 0.005 to 10.

32. The organotemplate-free zeolitic material of claim 28, wherein said material comprises at least sodium and/or potassium.

33. The organotemplate-free zeolitic material of claim 28, wherein at least a portion of the Y atoms and/or of the X atoms in the LEV-type framework structure is isomorphously substituted by one or more elements.

34. The organotemplate-free zeolitic material of claim 33, wherein the molar ratio of $YO_2$ to the at least one element ranges from 5 to 100.

35. The organotemplate-free zeolitic material of claim 28, wherein at least a portion of the alkali metal atoms M is substituted by one or more cation and/or cationic element.

36. The organotemplate-free zeolitic material of claim 28, wherein the BET surface area of the zeolitic material determined according to DIN 66135 ranges from 50 to 700 m$^2$/g.

37. The organotemplate-free zeolitic material of claim 28, wherein said material comprises one or more zeolites selected from the group consisting of Levyne, LZ-132, NU-3, RU B-1, ZK-20, ZSM-45, RUB-50, and mixtures of two or more thereof.

* * * * *